(12) United States Patent
Sonoda et al.

(10) Patent No.: US 7,999,866 B2
(45) Date of Patent: Aug. 16, 2011

(54) IMAGING APPARATUS AND PROCESSING METHOD THEREOF

(75) Inventors: Kazuhiro Sonoda, Yokohama (JP); Shintaro Takenaka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 562 days.

(21) Appl. No.: 12/121,349

(22) Filed: May 15, 2008

(65) Prior Publication Data
US 2008/0291290 A1 Nov. 27, 2008

(30) Foreign Application Priority Data

May 21, 2007 (JP) ................................. 2007-134495
Dec. 27, 2007 (JP) ................................. 2007-337461

(51) Int. Cl.
*H04N 9/64* (2006.01)
*H04N 5/217* (2011.01)
(52) U.S. Cl. .................... 348/245; 348/241; 348/243
(58) Field of Classification Search ............ 348/207.99, 348/222.1, 228.1, 230.1, 234, 241, 243, 245, 348/250, 251, 272, 281, 282, 283, 294, 297, 348/298, 299, 300, 301, 302, 303, 304, 307, 348/308, 309, 310, 311, 312, 313, 314, 315, 348/316, 317, 318, 319, 320, 321, 322, 323, 348/324
See application file for complete search history.

(56) References Cited

U.S. PATENT DOCUMENTS

| | | | |
|---|---|---|---|
| 6,445,413 B1 * | 9/2002 | Hosier et al. | 348/245 |
| 6,900,837 B2 * | 5/2005 | Muramatsu et al. | 348/243 |
| 7,427,735 B2 * | 9/2008 | Eskerud | 250/208.1 |
| 2005/0068431 A1 * | 3/2005 | Mori | 348/241 |
| 2007/0052813 A1 * | 3/2007 | Neter | 348/222.1 |
| 2008/0024634 A1 | 1/2008 | Takenaka | 348/307 |
| 2008/0225145 A1 | 9/2008 | Sonoda | 348/294 |
| 2009/0207289 A1 * | 8/2009 | Masuyama | 348/300 |

FOREIGN PATENT DOCUMENTS

| | | |
|---|---|---|
| JP | 2000-138864 A | 5/2000 |
| JP | 2000-150854 A | 5/2000 |
| JP | 2002-16841 A | 1/2002 |
| JP | 2004-15712 A | 1/2004 |
| JP | 2005-176061 A | 6/2005 |

\* cited by examiner

*Primary Examiner* — Jason Chan
*Assistant Examiner* — Peter Chon
(74) *Attorney, Agent, or Firm* — Fitzpatrick, Cella, Harper & Scinto

(57) ABSTRACT

An imaging apparatus is provided having: a pixel unit including an effective pixel region of multiple pixels accumulating charges generated according to incident light to output signals and an ineffective pixel region of multiple pixels outputting signals not dependent on incident light; a plurality of vertical signal lines provided for each column of pixels of pixel unit; a vertical scanning circuit that scans and selects pixels of pixel unit in row units to output signals of selected pixels of same row to plurality of vertical signal lines; and a horizontal scanning circuit that scans and selects signals of plurality of vertical signal lines to output signals of selected vertical signal lines; wherein the vertical scanning circuit selects pixels of same row of effective pixel region in row units once during one frame and selects pixels of same row of ineffective pixel region in row units multiple times during one frame.

9 Claims, 19 Drawing Sheets

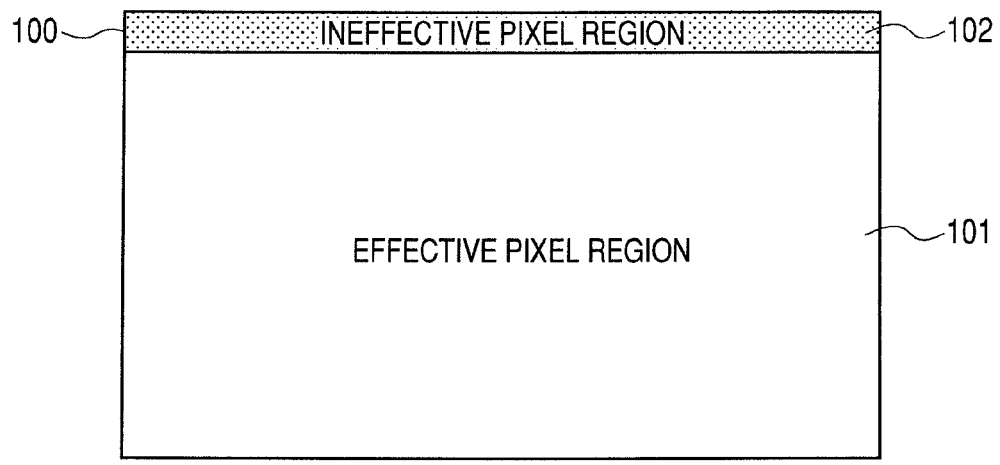
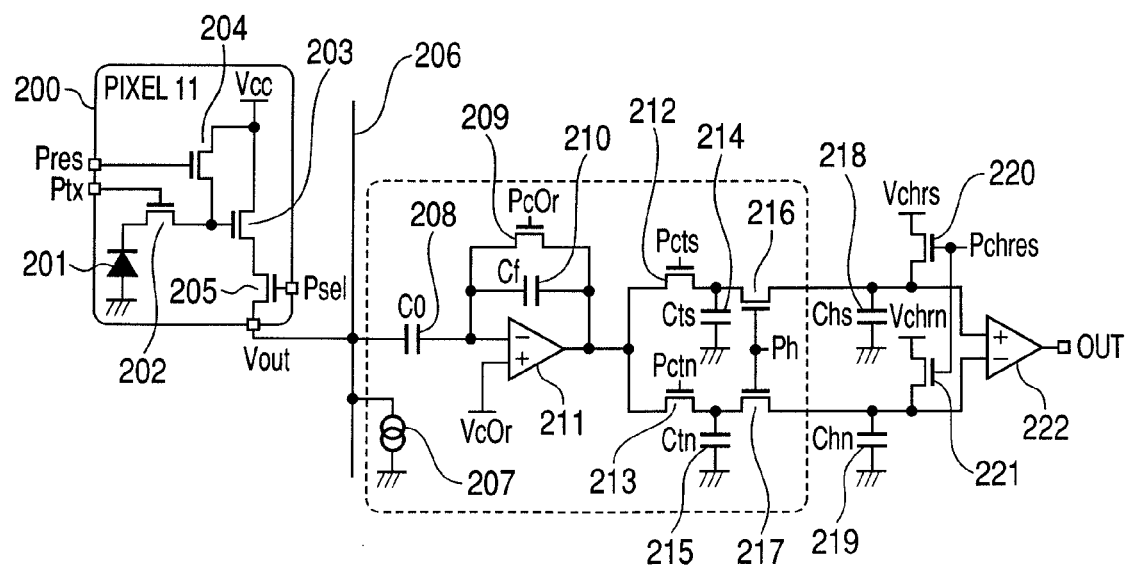

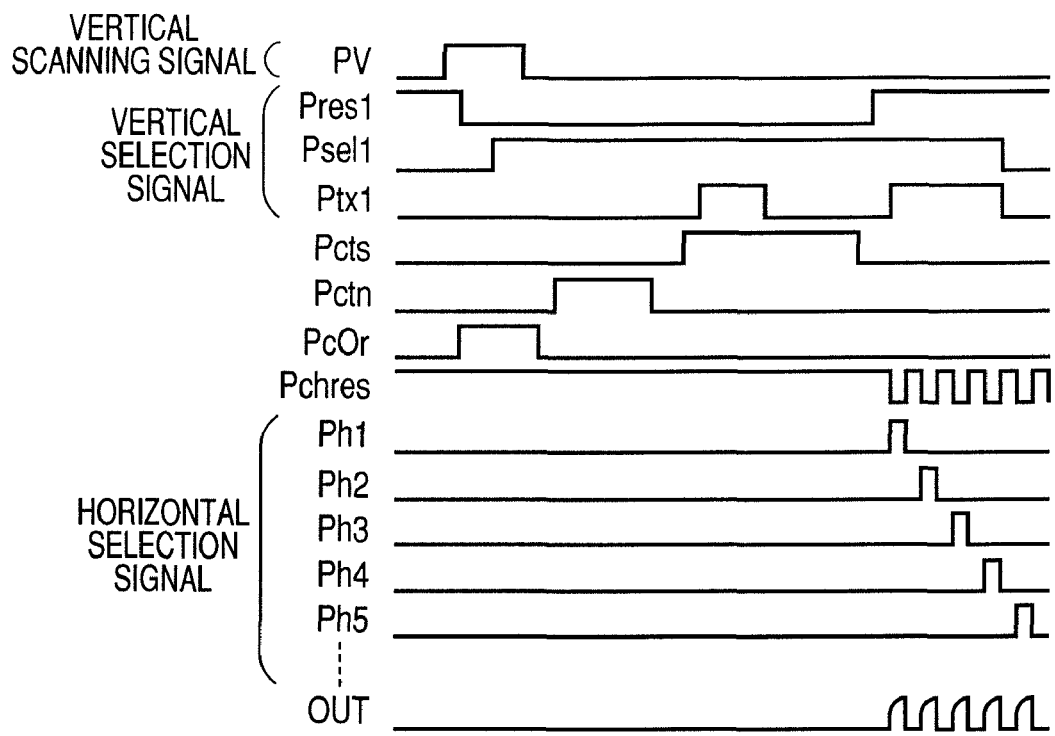
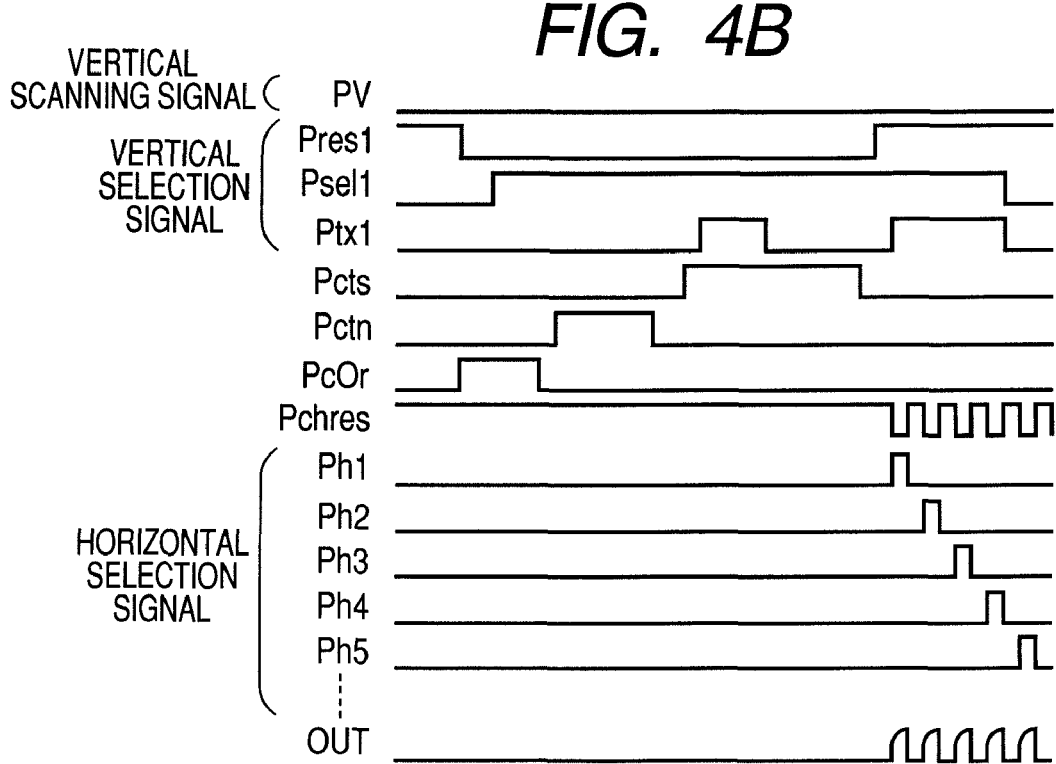

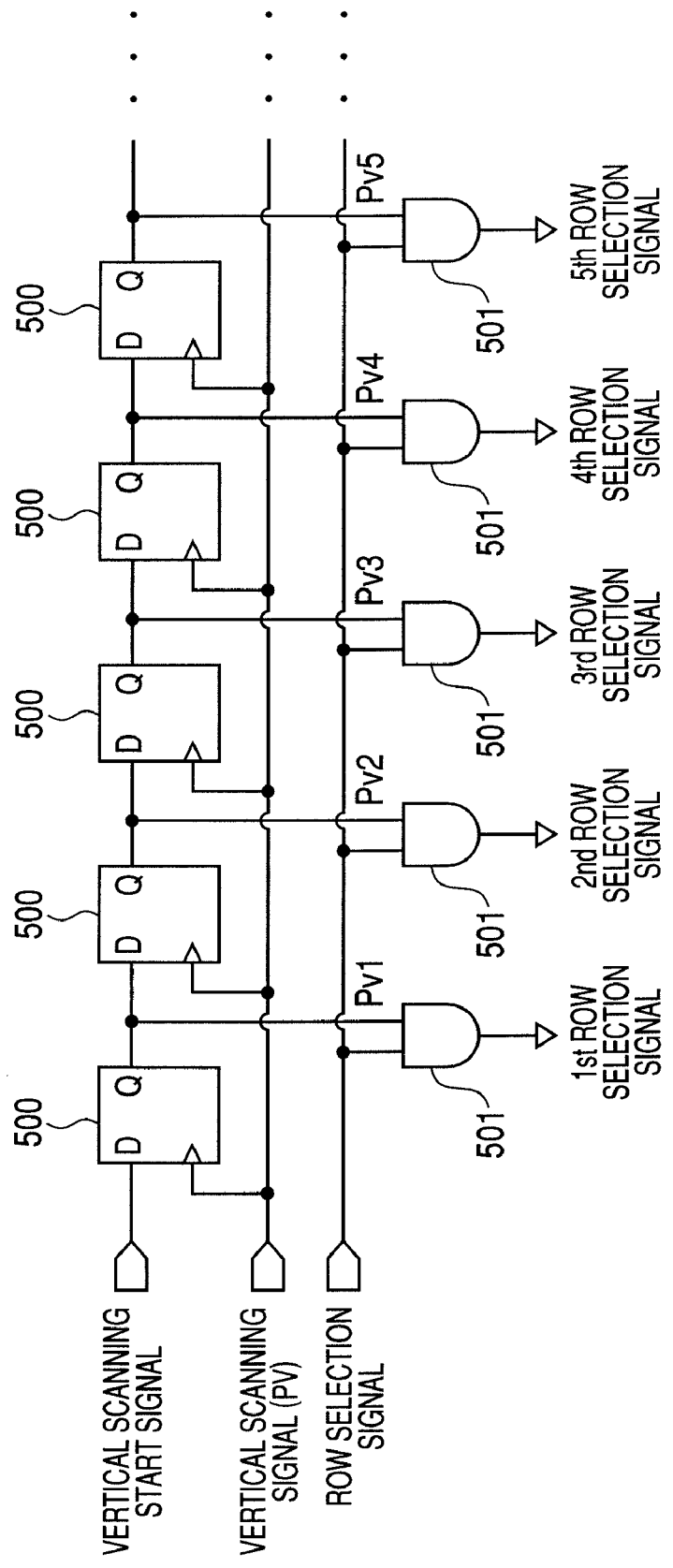

IMAGING APPARATUS AND PROCESSING METHOD THEREOF

BACKGROUND OF THE INVENTION

1. Field of the Invention

The present invention relates to an imaging apparatus such as a CMOS image sensor and a processing method thereof.

2. Description of the Related Art

Imaging apparatuses such as electronic cameras that employ a memory card having a solid-state memory device as a recording medium are already known as imaging apparatus that image, record, and play back still images or moving images. These electronic cameras record and play back still images or moving images that are imaged with a solid-state imaging device such as a CCD or a CMOS.

When imaging using an imaging device, processing is carried out using dark pixel signals that are read out after performing charge accumulation in a similar manner to actual imaging in a state in which the imaging device is not exposed and actual imaging pixel signals that are read out after performing charge accumulation in a state in which the imaging device is exposed. It is thereby possible to perform dark noise correction processing. As a result, a high quality image can be obtained by correcting imaged pixel signals with respect to image degradation such as pixel defects caused by unique minute flaws of the imaging device, fixed pattern noise caused by a readout circuit, or dark current noise generated in the imaging device.

In a correction method that uses dark pixel signals, since a large-capacity memory for one frame is necessary for storing dark pixel signals, the cost of the imaging apparatus is increased. Also, since it is necessary to previously acquire dark pixel signals for one frame prior to actual imaging, a shutter release time lag increases and hinders optimum imaging. Further, since random components that are referred to as random noise are included in dark pixel signals, fixed pattern noise can not be completely suppressed by only performing processing to subtract dark pixel signals from actual imaging pixel signals.

To solve this problem, a method has been proposed that divides a pixel region into an effective pixel region and an ineffective pixel region, averages the pixel signals of the ineffective pixel region, and performs processing to subtract the obtained average value from the pixel signals of the effective pixel region. The effective pixel region outputs signals that accumulate charges generated according to incident light on the pixel region of the imaging device. The ineffective pixel region is a pixel region in which, for example, a pixel surface of the same circuit configuration as the effective pixel region is covered with a light-shielding film such as aluminum, and which outputs signals that are not dependent on incident light. According to this method, averaging parameters are increased by subjecting pixel signals of the ineffective pixel region to averaging processing, and random noise included in the correction signal is decreased.

An object of Japanese Patent Application Laid-Open No. 2002-016841 is to provide a solid-state imaging apparatus which generates a correction signal based on pixel signals of an ineffective pixel region having a plurality of rows to increase the reliability of the correction signal and suppress fixed pattern noise. To achieve the above object, a solid-state imaging apparatus is proposed in which a correction signal for one row portion is generated from light shielded pixels of a plurality of row portions and pixel signals of effective pixels are corrected.

Japanese Patent Application Laid-Open No. 2004-015712 proposes a solid-state imaging apparatus in which pixel signals obtained from pixel signals of an ineffective pixel region are totaled across a plurality of frames, and an average value is determined from that total value to generate a correction signal and suppress fixed pattern noise.

Japanese Patent Application Laid-Open No. 2000-138864 proposes an imaging apparatus in which reading of each photoelectric conversion element is performed a plurality of times within a single-field period, and charges of elements for detecting a vertical black reference are read per every reading that is conducted a plurality of times within a single-field period.

However, there are the following problems with the above described methods of suppressing fixed pattern noise according to the prior art.

According to the solid-state imaging apparatus proposed in Japanese Patent Application Laid-Open No. 2002-016841, there is the problem that when an ineffective pixel region with a large number of rows is provided to enhance the reliability of a correction signal, the chip area increases. More specifically, the influence of random noise included in a correction signal is reduced by providing a large number of rows in the ineffective pixel region used for averaging.

According to the solid-state imaging apparatus proposed in Japanese Patent Application Laid-Open No. 2004-15712, there is the problem that since pixel signals of an ineffective pixel region extending across a plurality of frames are required to generate a correction signal, the invention can not be used in an imaging mode that captures only a single frame such as when a single image is captured using a digital still camera. More specifically, the influence of random noise included in a correction signal is reduced by increasing the number of frames of pixel signals of an ineffective pixel region used for averaging.

According to the solid-state imaging apparatus proposed in Japanese Patent Application Laid-Open No. 2000-138864, the influence of random noise included in a correction signal is reduced by increasing the number of frames of pixel signals of an ineffective pixel region used for averaging. More specifically, there is the problem that since pixel signals of an ineffective pixel region extending across a plurality of frames are required to generate a correction signal, the invention can not be used in an imaging mode that captures only a single frame such as when a single image is captured using a digital still camera. Also, even in a case in which pixel signals of an ineffective pixel region that extends over a plurality of frames can be acquired as in a case of imaging a moving image, when the ineffective pixel region is small there is the problem that the response until the start of imaging worsens since a large number of frames are required. Further, there is the problem that when the number of frames to be integrated is decreased by increasing the ineffective pixel region, the chip area is increased.

To solve the above problems, an object of the present invention is to provide an imaging apparatus that reduces the influence of random noise included in a correction signal based on pixel signals of an ineffective pixel region of only one frame without increasing a chip area, as well as a processing method thereof.

SUMMARY OF THE INVENTION

An imaging apparatus according to the present invention has a pixel unit including an effective pixel region of a plurality of pixels that accumulate charges generated according to incident light and output a signal, and an ineffective pixel region of a plurality of pixels that output a signal that does not depend on incident light; a plurality of vertical signal lines provided for each column of pixels of the pixel unit; a vertical scanning circuit that, by scanning and selecting pixels of the pixel unit in row units, outputs signals of pixels of the same row that is selected to the plurality of vertical signal lines; and a horizontal scanning circuit that, by scanning and selecting signals of the plurality of vertical signal lines, outputs a signal of the selected vertical signal line; wherein the vertical scanning circuit selects pixels of a same row of the effective pixel region in row units one time during one frame, and selects pixels of a same row of the ineffective pixel region in row units a plurality of times during one frame.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 1 is a plan view of a pixel unit of a solid-state imaging apparatus relating to a first embodiment of the present invention.

FIG. 2 is a circuit diagram of a pixel, a readout circuit, and a common output circuit of a CMOS-type solid-state imaging apparatus.

FIGS. 4A and 4B are timing charts of the solid-state imaging apparatus relating to the first embodiment of the present invention.

FIG. 5 is a circuit diagram of a vertical scanning circuit of a CMOS-type solid-state imaging apparatus.

DESCRIPTION OF THE EMBODIMENTS

Figure 3:
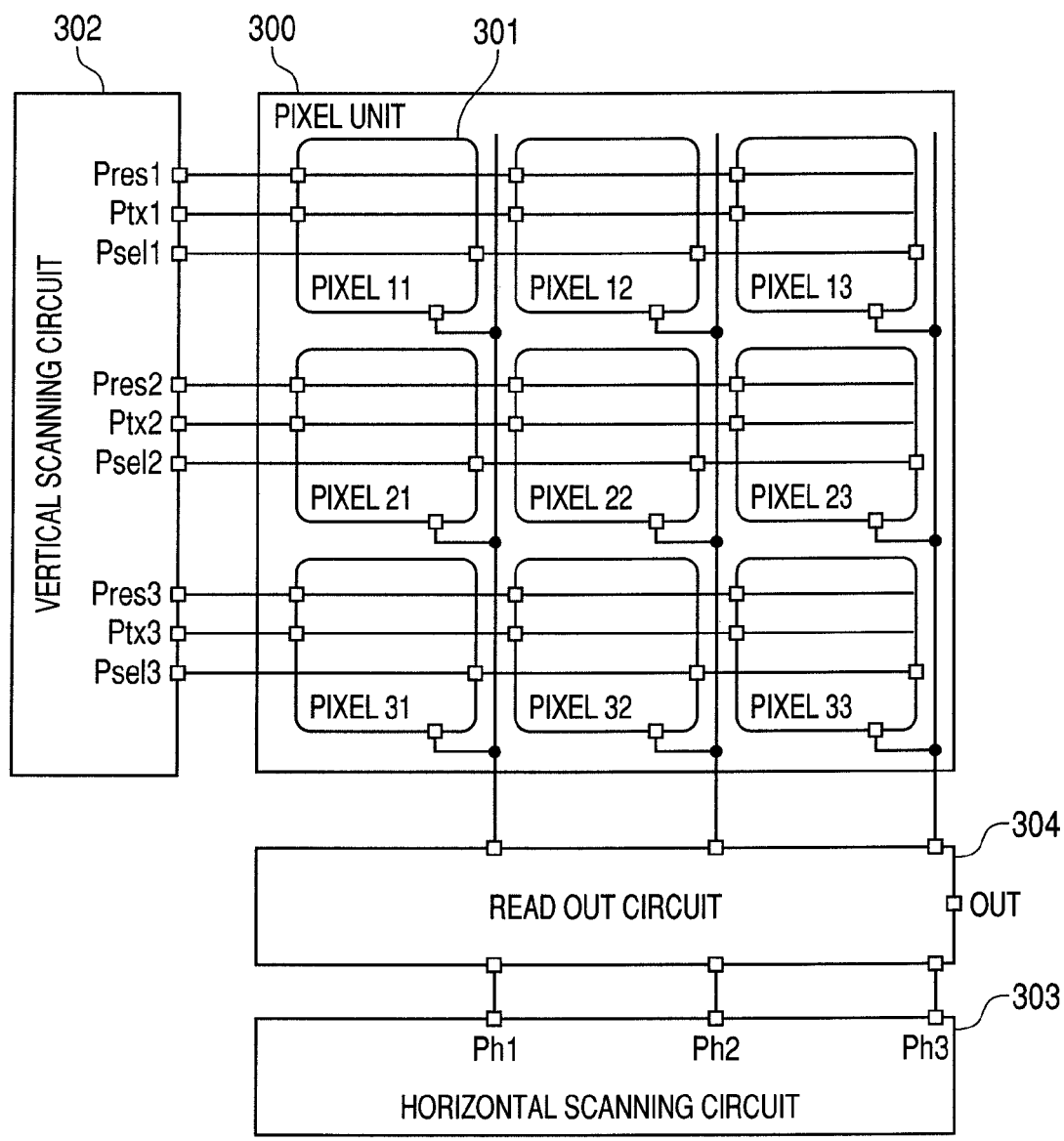
FIG. 3 is a block diagram illustrating a configuration example of a CMOS-type solid-state imaging apparatus.

The accompanying drawings, which are incorporated in and constitute a part of the specification, illustrate embodiments of the invention and, together with the description, serve to explain the principles of the invention.

First Embodiment

Hereunder, the first embodiment of the present invention is described in detail using the drawings.

FIG. 1 is a plan view of a pixel unit of a solid-state imaging apparatus relating to a first embodiment of the present invention. A solid-state imaging apparatus according to the present embodiment has a pixel unit 100 that includes an effective pixel region 101 having a plurality of pixels that accumulates charges generated in response to incident light and output signals and an ineffective pixel region 102 having a plurality of pixels that output signals that are not dependent on incident light. The ineffective pixel region 102 is disposed in a row unit at the top in the vertical direction of the pixel unit 100. For example, a semiconductor impurity region for accumulating a charge is formed in the pixels of the effective pixel region 101, and a semiconductor impurity region for accumulating a charge is not formed in the pixels of the ineffective pixel region 102.

FIG. 2 is a circuit diagram of a pixel, a readout circuit, and a common output circuit of a CMOS-type solid-state imaging apparatus. A pixel 200 is configured as follows. A photodiode 201 converts received light into a charge. In this example, the anode side of the photodiode 201 that generates a light signal charge is grounded. The cathode side of the photodiode 201 is connected to a gate of an amplification MOS transistor 203 through a transfer MOS transistor 202. To the gate of the amplification MOS transistor 203 is connected a source of a reset MOS transistor 204 for resetting the amplification MOS transistor 203. The drain of the reset MOS transistor 204 is connected to a power supply voltage Vcc. The drain of the amplification MOS transistor 203 is connected to the power supply voltage Vcc, and the source is connected to the drain of a selection MOS transistor 205.

FIG. 3 is a block diagram that illustrates a configuration example of a CMOS-type solid-state imaging apparatus. A pixel unit 300 is composed of 3×3 pixels, in which three unit pixels 301 are disposed in a row direction, and three unit pixels 301 are disposed in a column direction. The CMOS-type solid-state imaging apparatus includes a vertical scanning circuit 302 that selects a row to be read out, a horizontal scanning circuit 303 that selects a column to be read out, and a readout circuit 304 that performs amplification and noise removal with respect to pixel signals. The unit pixel 301 corresponds to the pixel 200 shown in FIG. 2. An operation to read out a pixel signal is described hereafter. A plurality of vertical signal lines 206 shown in FIG. 2 are provided for each column of pixels 301 of the pixel unit 300. The vertical scanning circuit 302 outputs signals of the same row of pixels selected by scanning and selecting pixels 301 of the pixel unit 300 in row units to the plurality of vertical signal lines 206. The vertical scanning circuit may select one row by one row the pixels 301 of the pixel unit 300, and may select plural rows by plural rows the pixels 301 of the pixel unit 300. The horizontal scanning circuit 303 outputs a signal of the vertical signal line 206 selected by scanning and selecting signals of the plurality of vertical signal lines 206.

The gate of the transfer MOS transistor 202 of a pixel 11 is connected to a first row selection line (vertical scanning line) Ptx1 that extends in the lateral direction. Gates of a similar transfer MOS transistor 202 of a pixel 12 and a pixel 13 that are disposed in the same row are also commonly connected to the above described first row selection line Ptx1. The gate of a reset MOS transistor 204 of the pixel 11 is connected to a second row selection line (vertical scanning line) Pres1 that is extends in the lateral direction. Gates of a similar reset MOS transistor 204 of the pixel 12 and the pixel 13 that are disposed in the same row are also commonly connected to the second row selection line Pres1. The gate of the selection MOS transistor 205 of the pixel 11 is connected to a third row selection line (vertical scanning line) Psel1 that extends in the lateral direction. Gates of a similar selection MOS transistor 205 of the pixel 12 and the pixel 13 that are disposed in the same row are also commonly connected to the third row selection line Psel1. The first to third row selection lines Ptx1, Pres1, and Psel1 are connected to the vertical scanning circuit 302 and a signal voltage is supplied thereto. Pixels of the same configuration and row selection lines are also provided in the remaining rows illustrated in FIG. 3. Row selection signals Ptx1, Pres1, and Psel1; Ptx2, Pres2, and Psel2; and Ptx3, Pres3, and Psel3 that are formed by the vertical scanning circuit 302 are supplied to these row selection lines. The sources of the selection MOS transistors 205 are connected to a vertical signal line 206 that extends in the longitudinal direction. Sources of similar selection MOS transistors 205 of pixels disposed in the same column are also connected to the vertical signal line 206. The section enclosed by a dashed line in FIG. 2 is a circuit example for one column block of the readout circuit 304 shown in FIG. 3. A pixel output Vout is connected to the vertical signal line 206. A constant current source 207 is connected to the vertical signal line 206. A feedback capacitor 210 is connected between the input and output of an amplifier 211.

FIG. 4A is a timing chart that illustrates a processing method of the CMOS-type solid-state imaging apparatus illustrated in FIG. 1 to FIG. 3. Prior to reading out a light signal charge from the photodiode 201, the gate Pres1 of the reset MOS transistor 204 changes to high level. As a result, the gate of the amplification MOS transistor 203 is reset to a reset power supply voltage. After a gate Pc0r of a clamp switch 209 changes to high level at the same time as the gate Pres1 of the reset MOS transistor 204 returns to low level, the gate Psel1 of the selection MOS transistor 205 changes to high level. Thereby, a reset signal (noise signal) in which reset noise is superposed is read out to the vertical signal line 206 and clamped by a clamp capacitor 208 (C0) of each column. Next, after a gate Pc0r of a clamp switch 209 returns to low level, a gate Pctn of an N-side transfer switch 213 changes to high level and a reset signal is held by a noise holding capacitor 215 (Ctn) provided in each column. Subsequently, a gate Pcts of an S-side transfer switch 212 changes to high level. Next, a gate Ptx1 of the transfer MOS transistor 202 changes to high level, and simultaneously to transfer of a light signal charge of the photodiode 201 to the gate of the amplification MOS transistor 203, a light signal is read out to the vertical signal line 206. Subsequently, after a gate Ptx1 of the transfer MOS transistor 202 returns to low level, a gate Pcts of the S-side transfer switch 212 changes to low level. Thereby, the amount of change (light signal) from the reset signal is read out to a signal holding capacitor 214 (Cts) provided in each column. By the operations up to this point, pixel signals connected to the first row are held by signal holding capacitors 214 and 215 (Ctn and Cts) that are connected to the respective columns. After pixel signals are held by the signal holding capacitors 214 and 215, the gate Pres1 of the reset MOS transistor 204 and the gate Ptx1 of the transfer MOS transistor 202 change to high level to thereby reset the photodiode 201 to the reset power supply voltage.

After pixel signals are held by the signal holding capacitors 214 and 215, gates of horizontal transfer switches 216 and 217 of each column are sequentially changed to high level by a signal Ph (Ph1) supplied from the horizontal scanning circuit 303. Voltages that are held at the signal holding capacitors 214 and 215 (Cts and Ctn) are read out sequentially to the horizontal output line capacitors 218 and 219 (Chs and Chn), subjected to differential processing at an output amplifier 222 and sequentially output to an output terminal OUT. More specifically, the output amplifier 222 subtracts the signal of the horizontal output line capacitor 219 from the signal of the horizontal output line capacitor 218 to remove a noise component. During an interval between reading out signals of each column, the horizontal output line capacitors 218 and 219 (Chs and Chn) are reset to reset voltages Vchrs and Vchrn by reset switches 220 and 221. Thus, read out of pixels connected in the first row is completed.

FIG. 5 is a view that illustrates one example of the vertical scanning circuit 302 shown in FIG. 3. The vertical scanning circuit 302 comprises a shift register circuit that sequentially transfers a vertical scanning start signal to subsequent flip-flops 500 in synchrony with the rising edge of a vertical scanning signal PV shown in FIG. 4A. Row selection signals Ptx, Pres, and Psel and output signals Pv1 to Pv5 of flip-flops 500 are connected to inputs of AND gates 501 provided in each column. Thus, row selection signals that are independent for each row are generated by the vertical scanning signal PV.

Figure 6:
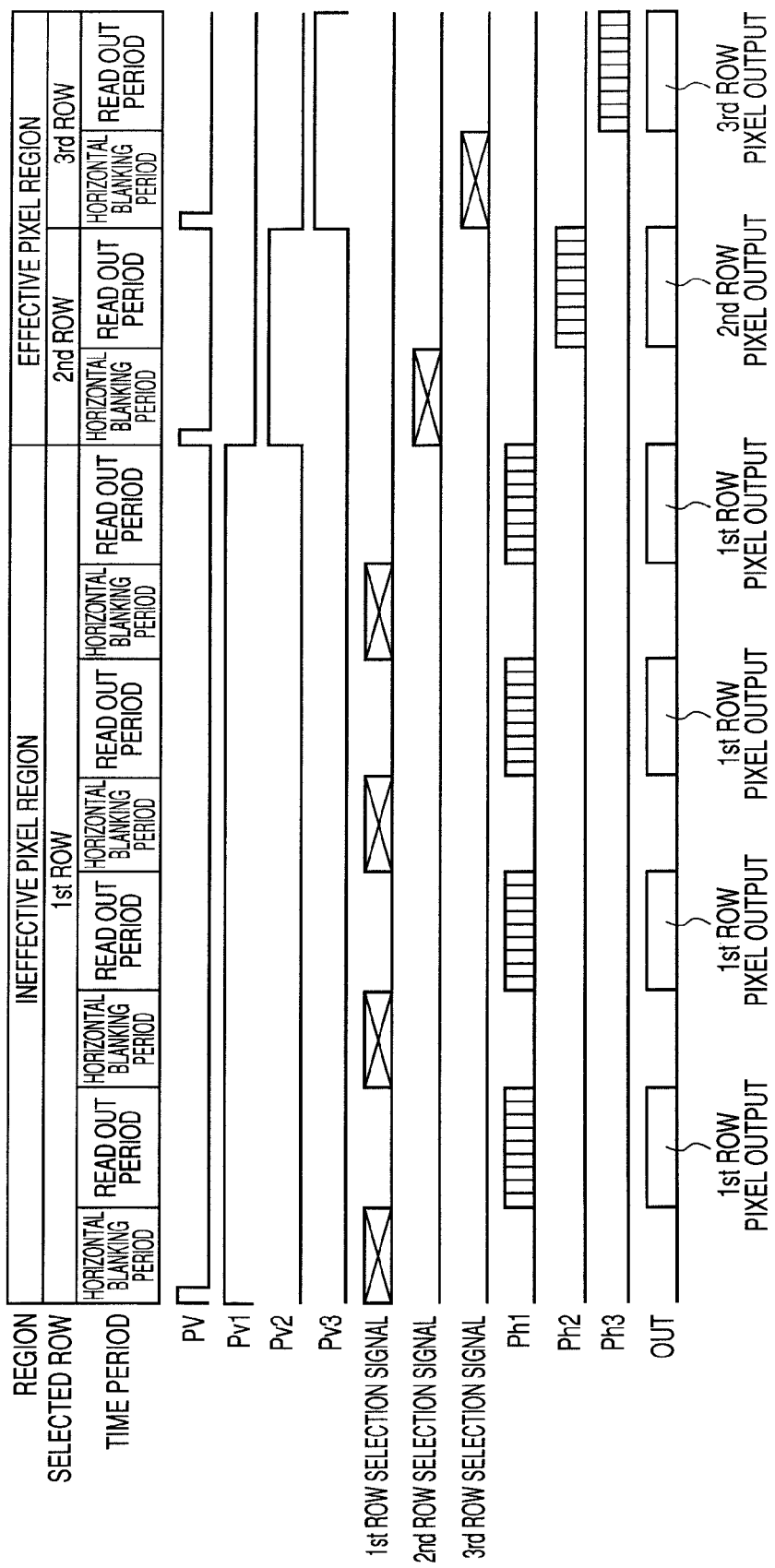
FIG. 6 is a timing chart of the solid-state imaging apparatus relating to the first embodiment of the present invention.

FIG. 6 is a timing chart that illustrates operations of the solid-state imaging apparatus relating to the present embodiment. According to the present embodiment, the ineffective pixel region 102 shown in FIG. 1 is disposed in one row at the top in the vertical direction of the pixel unit 100. In the present embodiment, in order to output pixel signals of the ineffective pixel region consisting of one row disposed at the top of the pixel unit over four horizontal scanning time periods, the row selection signal Pv1 that selects the first row is output over four horizontal scanning time periods. In order to generate the row selection signal Pv1, as shown in FIG. 4B, the vertical scanning signal PV is set to low level during the 2 to 4 horizontal scanning time periods and shift operations of the shift register circuit shown in FIG. 5 are stopped. As a result, pixel signals of the first row are repeatedly output over four horizontal scanning time periods.

In the present specification, the term "one horizontal scanning time period" refers to a length of time in which pixel signals of one row are read out that is obtained by adding a time period in which a light signal is converted to a voltage and transferred to an internal capacitor (horizontal blanking time period) and a time period in which pixel signals are scanned are read out (horizontal transfer period). In FIG. 4, a time period in which horizontal selection signals ph1, ph2 . . . are input is the "horizontal transfer period", and the time period before that is the "horizontal blanking time period". One horizontal scanning time period is the interval of a horizontal synchronizing signal.

By thereafter repeating the operations of the timing chart shown in FIG. 4A once more, pixel signals connected to the second and subsequent rows are sequentially read out by means of a signal from the vertical scanning circuit 302 to complete read out of all pixels. For the second and subsequent rows, pixel signals of the effective pixel region 101 of each row are output per one horizontal scanning time period (one time).

A period from the start of an operation to read out pixel signals of the first row comprising the pixel unit 100 until completing read out of pixel signals of the last row in this manner is defined as one frame period.

Figure 7:
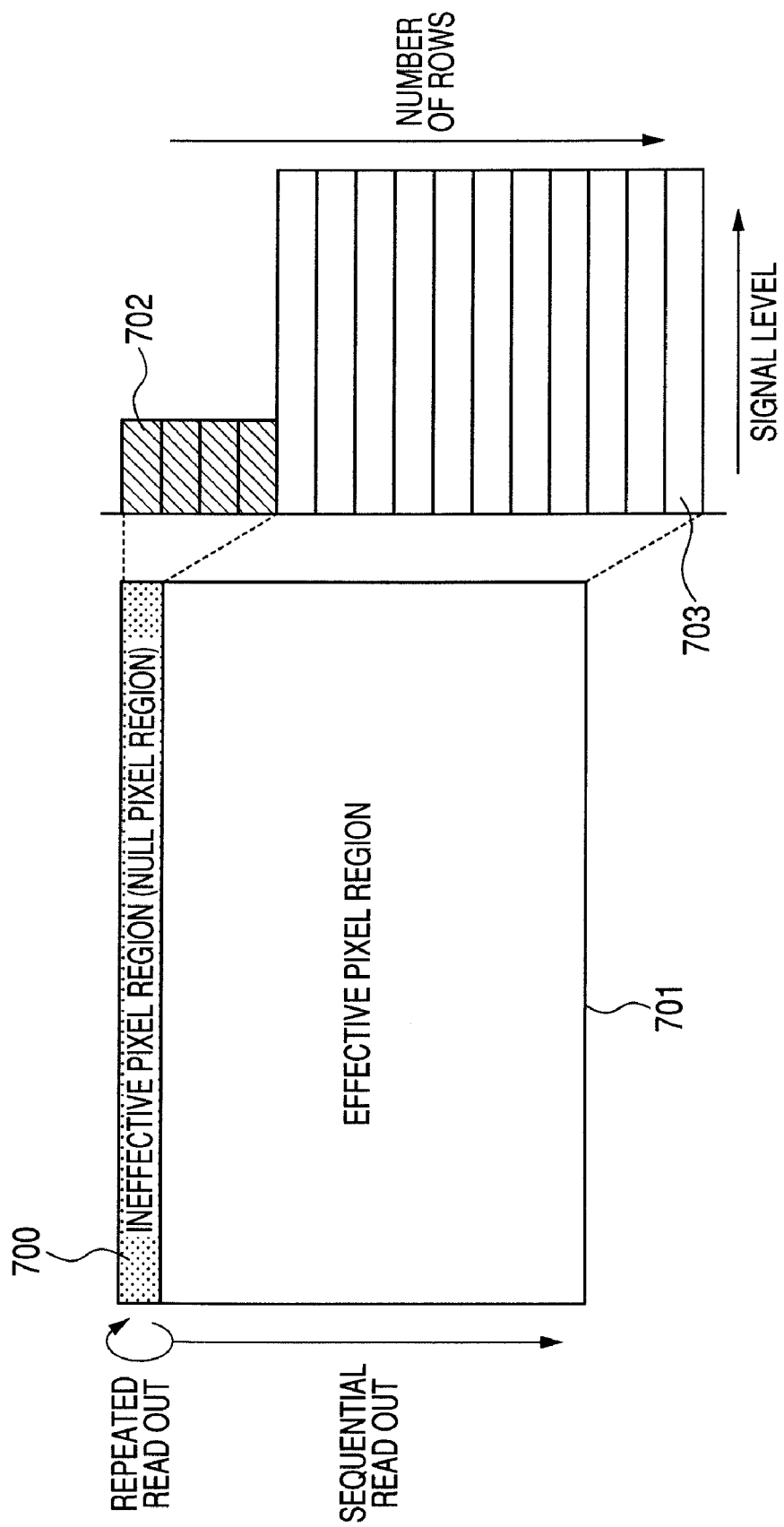
FIG. 7 is a conceptual diagram that describes signal levels of pixel signals of the solid-state imaging apparatus relating to the first embodiment of the present invention.

FIG. 7 is a conceptual diagram that describes signal levels of read-out pixel signals of the solid-state imaging apparatus relating to the present embodiment. According to the present embodiment, pixels of an ineffective pixel region are composed of null pixels that do not form a semiconductor impurity region for accumulating a charge. The ineffective pixel region consists of one row. Since the pixel signals 702 of the ineffective pixel region 700 are null pixel signals, they constitute a signal level that serves as a standard for the black level of a captured image. By reading out the pixel signals of the ineffective pixel region 700 that has only one row at the timings shown in FIG. 6, the number of pixel signals can be increased to that of four rows and read out. After reading out the null pixel signals 702 in an amount equivalent to four rows, output of a row selection signal starts once more, and effective pixel signals 703 of the effective pixel region 701 that outputs signals which accumulate charges that are generated according to incident light are output for each row.

Figure 8:
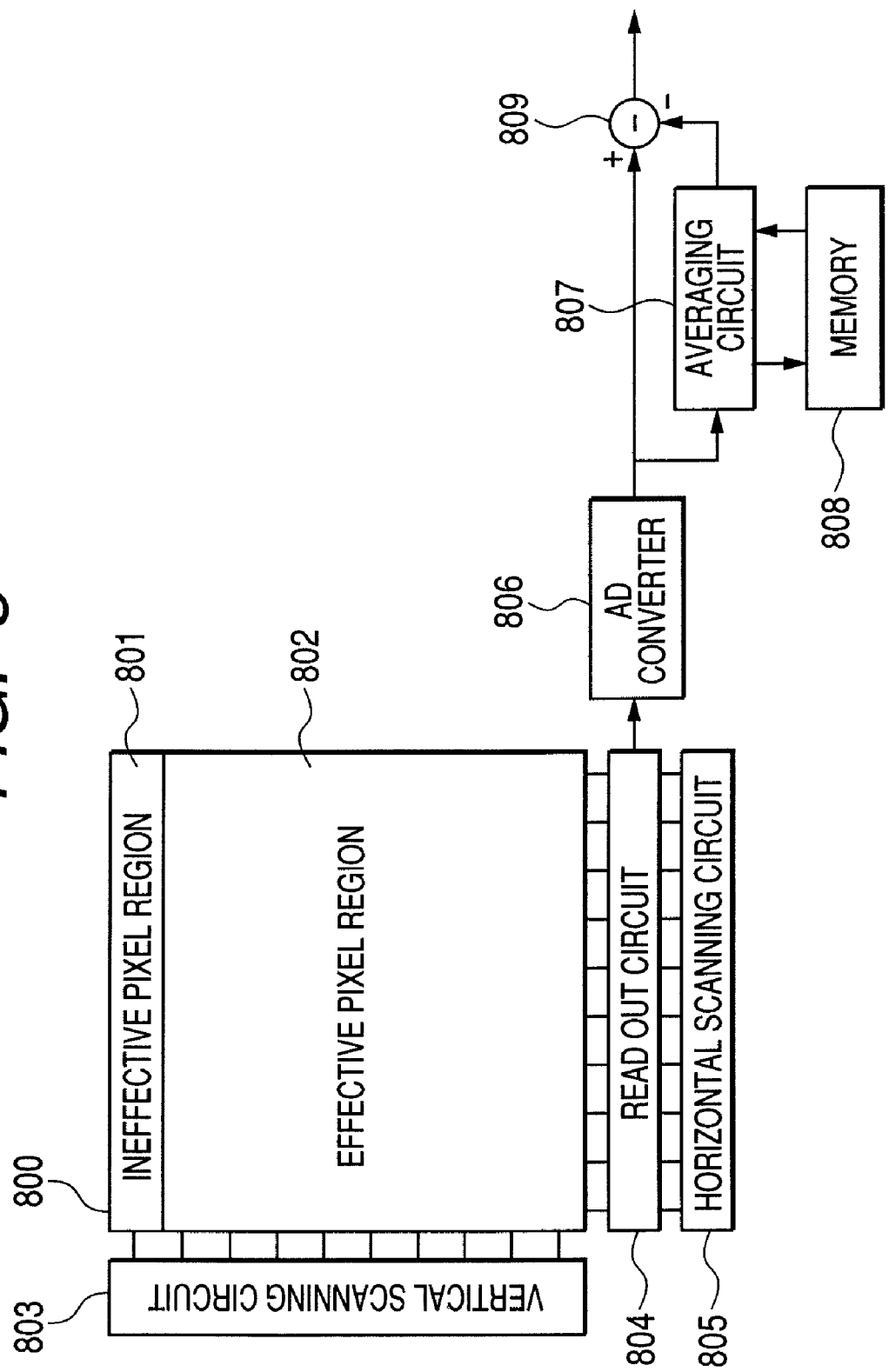
FIG. 8 is a block diagram that includes a pixel signal correction circuit of the solid-state imaging apparatus relating to the first embodiment of the present invention.

FIG. 8 is a block diagram that includes a pixel signal correction circuit of a solid-state imaging apparatus relating to the present embodiment. The configuration illustrated in FIG. 8 includes a pixel unit 800, an ineffective pixel region 801, an effective pixel region 802, a vertical scanning circuit 803, a readout circuit 804, and a horizontal scanning circuit 805. Analog pixel signals output from the readout circuit 804 by the above described operations are digitized by an AD converter 806. An averaging circuit 807 calculates an average value for each column with respect to pixel signals of the ineffective pixel region 801 that are increased to an amount equivalent to four rows. The calculated average value for each column is stored in a memory 808. By subtracting the stored average value for each column from the pixel signals of the effective pixel region 802 using a subtracter 809, fixed pattern noise occurring in each column can be accurately suppressed.

The vertical scanning circuit 302 selects pixels of the same row of the pixel unit 800 in row units a plurality of times during one frame. More specifically, the vertical scanning circuit 802 selects pixels of the same row of the effective pixel region 802 in row units once during one frame and selects pixels of the same row of the ineffective pixel region 801 in row units a plurality of times during one frame. For example, the vertical scanning circuit 802 selects pixels of the first row four times. The correction circuit has the averaging circuit 807, the memory 808, and the subtracter 809 shown in FIG. 8. The correction circuit corrects pixel signals of the effective pixel region 802 using the pixel signals that are selected a plurality of times and output by the horizontal scanning circuit 805. More specifically, the correction circuit averages the pixel signals that are selected a plurality of times and corrects the pixel signals of the effective pixel region 802.

According to the present embodiment, pixels of the ineffective pixel region are composed of null pixels that do not form a semiconductor impurity region for accumulating a charge. However, in a case in which a period for accumulating a charge is short or a dark current of a photodiode is itself small, the effect of the present embodiment does not change even when a configuration is adopted in which pixels of the ineffective pixel region are composed of light shielded pixels in which the pixel surface of a circuit configuration that is the same as the effective pixel region is covered with a light-shielding film such as aluminum.

According to the present embodiment, although line memories of a number equivalent to the number of horizontal pixels are required to store average values for each column in memory, the effect of the present embodiment does not change even when a configuration is adopted in which the horizontal pixels are separated into several regions to reduce the number of memories storing.

According to the present embodiment, although the number of pixels of the ineffective pixel region that is averaged is one row, the effect of the present embodiment does not change even when the number of rows is increased to a degree that does not exert space-related pressure on the chip area. By adopting a configuration in which the rows of an ineffective pixel region having a plurality of rows are each read out a plurality of times to increase the read-out averaging parameters, an average value of an even higher accuracy can be calculated.

Second Embodiment

Although the second embodiment of the present invention resembles the first embodiment, a timing chart illustrating the operations of the solid-state imaging apparatus and a method of suppressing fixed pattern noise using pixel signals of an ineffective pixel region are different from the first embodiment. Hereunder, the present embodiment is described in detail using the drawings.

Figure 9:
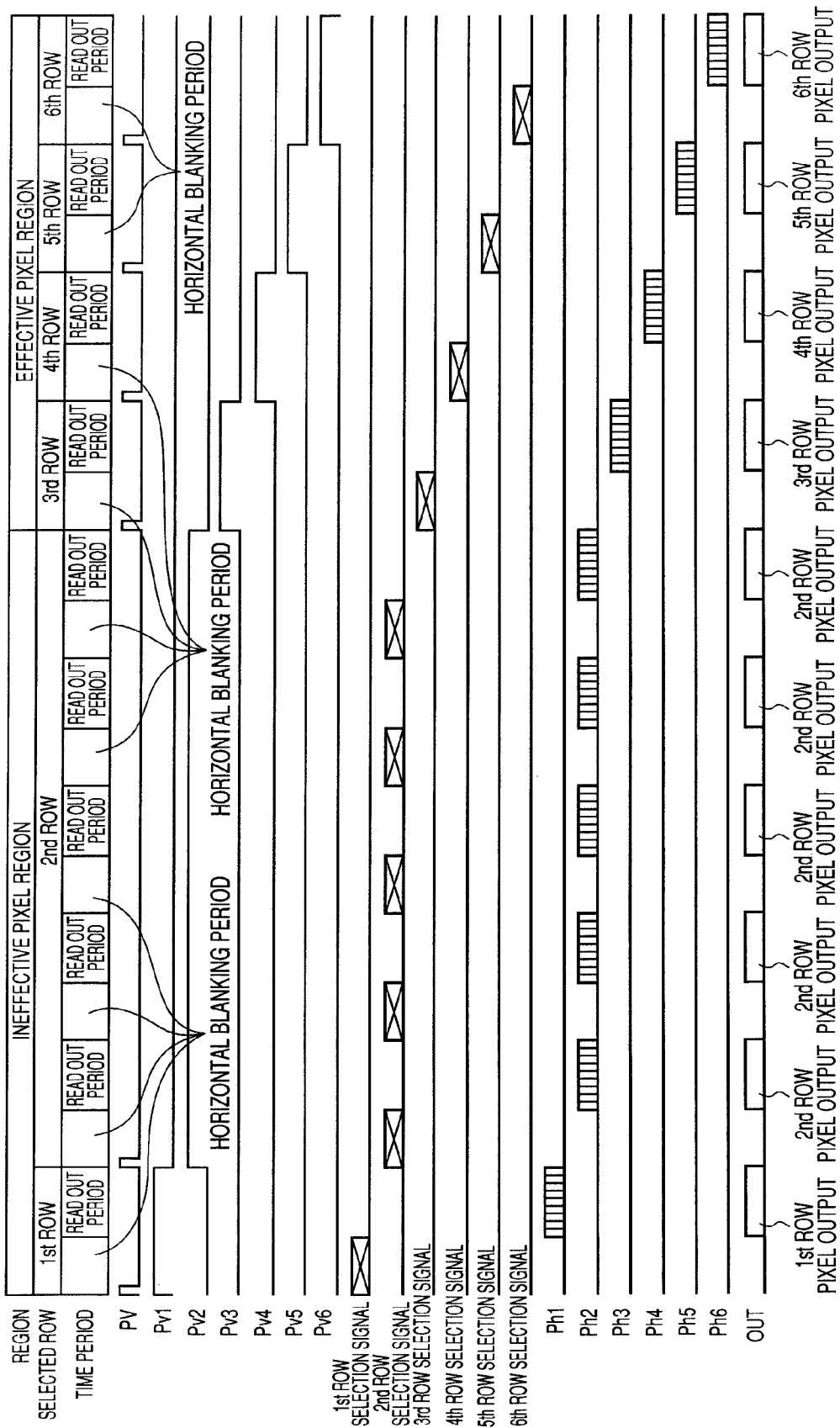
FIG. 9 is a timing chart of a solid-state imaging apparatus relating to a second embodiment of the present invention.

FIG. 9 is a timing chart that illustrates an example of operations of the solid-state imaging apparatus relating to the second embodiment of the present invention. According to the present embodiment, the ineffective pixel region 102 shown in FIG. 1 is provided as two rows at the top in the vertical direction of the pixel unit 100. In order to output pixel signals of the second row of the ineffective pixel region having two rows provided at the top of the pixel unit in an amount equivalent to five rows, a row selection signal Pv2 that selects the second row is a signal that outputs the amount of five rows. To generate the row selection signal Pv2, as shown in FIG. 4B, the vertical scanning signal PV is set at low level during 3 to 6 horizontal scanning time periods and shift operations of the shift register circuit shown in FIG. 5 are stopped. Thus, pixel signals of the second row are repeatedly output over five rows.

Thereafter, by repeating the operations of the timing chart shown in FIG. 4A once more, pixel signals connected to the third and subsequent rows are sequentially read out by means of a signal from the vertical scanning circuit to complete read out of all pixels. Rows other than the second row are output per one horizontal scanning time period (one time).

A period from the start of an operation to read out pixel signals of the first row that comprises the pixel unit until completing read out of pixel signals of the last row in this manner is defined as one frame period.

Figure 10:
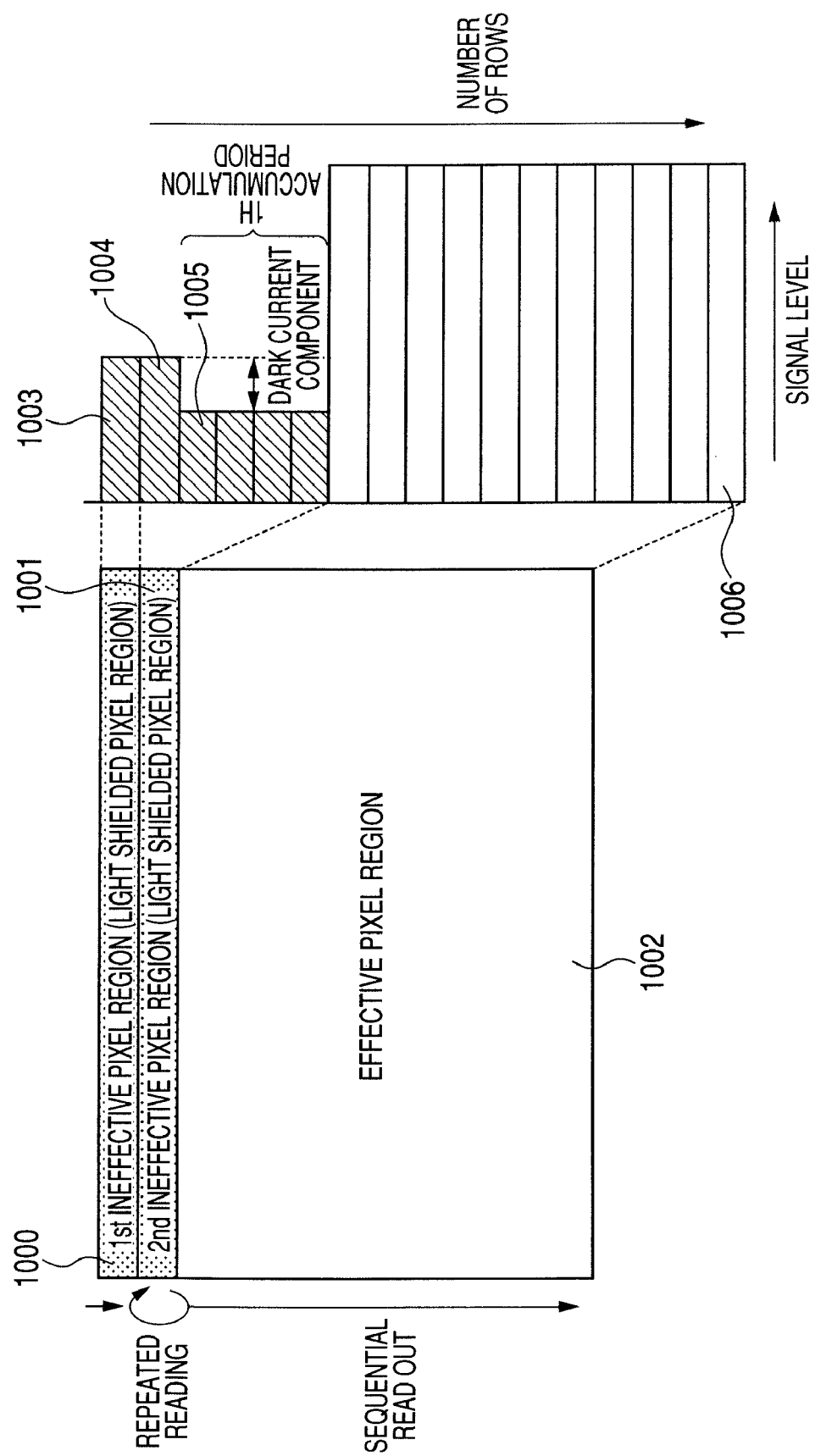
FIG. 10 is a conceptual diagram that describes signal levels of pixel signals of the solid-state imaging apparatus relating to the second embodiment of the present invention.

FIG. 10 is a conceptual diagram that describes signal levels of read-out pixel signals of the solid-state imaging apparatus relating to the present embodiment. According to the present embodiment, pixels of an ineffective pixel region are composed of light shielded pixels in which the pixel surface of a circuit configuration that is the same as the effective pixel region is covered with a light-shielding film such as aluminum. The ineffective pixel region consists of two rows. The first row is a first ineffective pixel region 1000, and the second row is a second ineffective pixel region 1001. Since pixel signals 1003 of the first ineffective pixel region 1000 are light-shielded pixel signal, a pixel signal level that is influenced by a dark current that depends on a temperature or an accumulation time is output. With respect to pixel signals 1004 of the second ineffective pixel region 1001 that is subsequently read out, a pixel signal level that is influenced by a dark current similarly to the pixel signal 1003 of the first ineffective pixel region 1000 is output. By reading out pixel signals according to the timings illustrated in FIG. 9, pixel signals of the second ineffective pixel region 1001 having only one row can be increased to a number equivalent to five rows and read out. With respect to pixel signals read out the second and subsequent times, since the photodiode and signal holding capacitor are reset at an immediately preceding horizontal scanning time period as shown in FIG. 4B, the pixel signals are pixel signals 1005 that are influenced by a dark current for which the accumulation time is one horizontal scanning time period. The length of a general single horizontal scanning time period is approximately several tens of μ seconds, and the influence of dark current for an accumulation period of this level can be mostly ignored. After reading out the pixel signals of these ineffective pixel regions, output of row selection signals is started once more to output effective pixel signals 1006 of the effective pixel region 1002 that outputs signals that accumulate charges generated according to incident light. Using the timings shown in FIG. 9, with the ineffective pixel regions 1000 and 1001 that consist of only two rows it is possible to acquire data 1003 and 1004 for two rows of pixel signals that are influenced by dark current, and data 1005 for four rows of pixel signals that receive almost no dark current influence during one frame.

Figure 11:
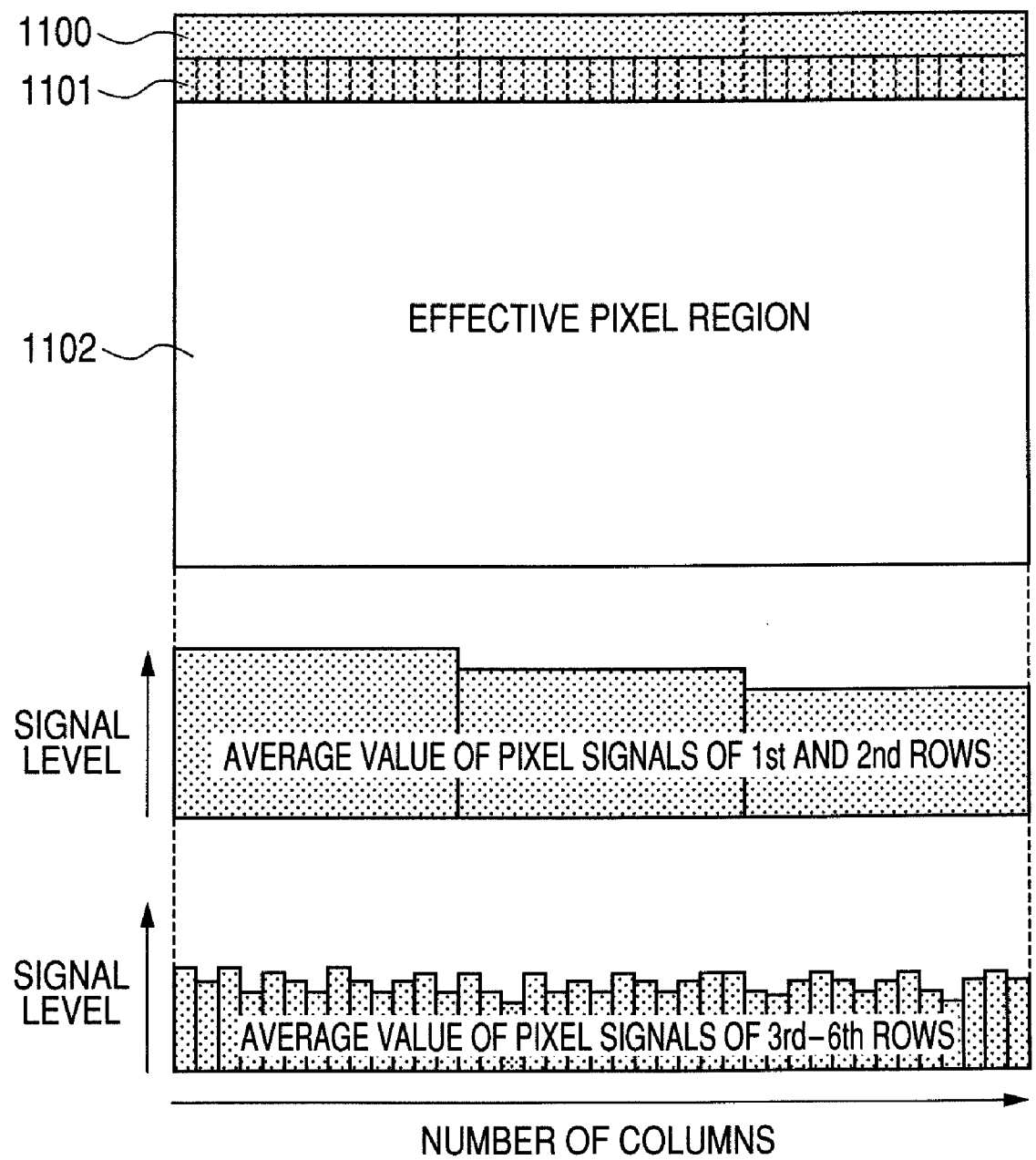
FIG. 11 is a conceptual diagram illustrating the correspondence between an average value calculation region and average values of pixel signals of a solid-state imaging apparatus relating to a second embodiment of the present invention.

FIG. 11 is a conceptual diagram illustrating the correspondence between an average value calculation region and average values of pixel signals read out by a solid-state imaging apparatus relating to the present embodiment. The average value calculation region illustrated in FIG. 11 includes a first ineffective pixel region 1100, a second ineffective pixel region 1101, and an effective pixel region 1102.

Figure 12:
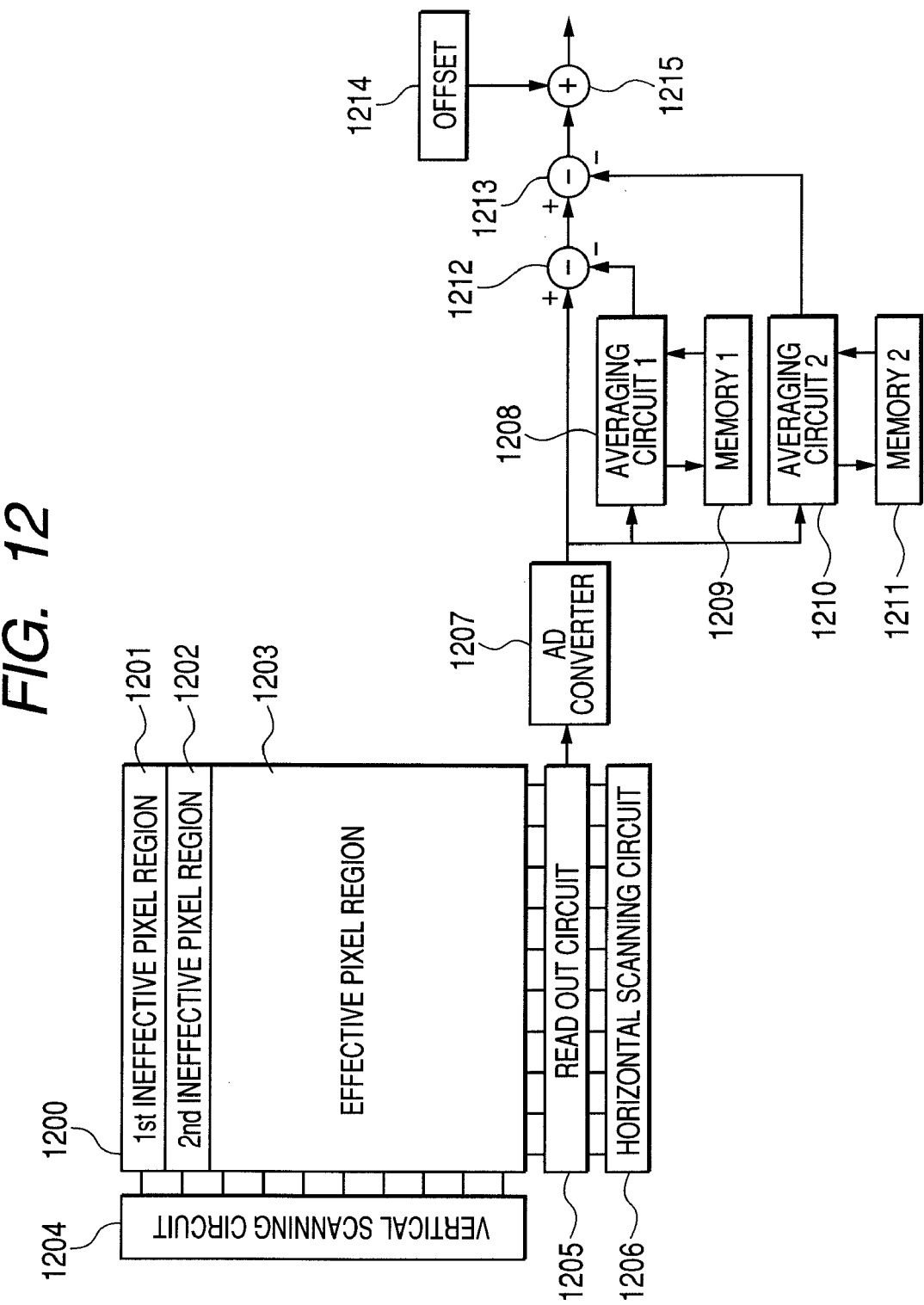
FIG. 12 is a block diagram including a pixel signal correction circuit of the solid-state imaging apparatus relating to the second embodiment of the present invention.

FIG. 12 is a block diagram that includes a pixel signal correction circuit of a solid-state imaging apparatus relating to the present embodiment. The configuration illustrated in FIG. 12 includes a pixel unit 1200, a first ineffective pixel region 1201, a second ineffective pixel region 1202, an effective pixel region 1203, a vertical scanning circuit 1204, a readout circuit 1205, and a horizontal scanning circuit 1206. Analog pixel signals output from the readout circuit 1205 by the aforementioned operations are digitized by an AD convertor 1207.

An average value of pixel signals of the first ineffective pixel region 1201 (pixel signals of first row=pixel signals of one row) and pixel signals of the second ineffective pixel region 1202 (pixel signals obtained by first read out of second row=pixel signals of second row) is calculated by a first averaging circuit 1208. As shown in FIG. 11, the first averaging circuit 1208 calculates an average value for each region obtained by horizontally dividing the first and second rows into three regions and stores the calculated values in a first memory 1209. Unlike a method that performs averaging for each column, since a large number of averaging parameters are obtained by calculating average values for respective regions consisting of a plurality of pixels, highly accurate average values can be obtained based on even the pixel signals of two rows. Next, the average value of pixel signals of the second ineffective pixel region 1202 (pixel signals for second read to pixel signals for fifth read out of second row=pixel signals of third row to sixth row) is calculated by the second averaging circuit 1210. As shown in FIG. 11, the second averaging circuit 1210 calculates an average value for each column and stores the calculated values in a second memory 1211. Since averaging is performed for each column, pixel signals for four rows are used according to the present embodiment to increase the averaging parameters. The two average values calculated in this manner are subtracted from the pixel signals of the effective pixel region 1203 by respective subtracting circuits 1212 and 1213. As illustrated in FIG. 12, for the purpose of cancelling out the effect of subtracting two average values, an adding circuit 1215 may add an offset 1214 for black level adjustment to the output signal of the subtracting circuit 1213. According to the above described method, by using the present embodiment it is possible to accurately suppress influences due to dark current of a solid-state imaging apparatus and fixed pattern noise occurring in each column.

The ineffective pixel region includes the first ineffective pixel region 1201 and the second ineffective pixel region 1202 that have mutually different rows. The vertical scanning circuit 1204 selects pixels of the same row of the second ineffective pixel region 1202 in row units a plurality of times during one frame. The correction circuit has a first correction circuit and a second correction circuit. More specifically, the correction circuit has averaging circuits 1208 and 1210, memories 1209 and 1211, subtracters 1212 and 1213, and an adder 1215. The first correction circuit has the averaging circuit 1208, the memory 1209, and the subtracter 1212. The first correction circuit averages the pixel signals of the first ineffective pixel region 1201 and the second ineffective pixel region 1202 that are selected the first time and corrects the pixel signals of the effective pixel region 1203. The second correction circuit has the averaging circuit 1210, the memory 1211, and the subtracter 1213. The second correction circuit averages the pixel signals of the second ineffective pixel region 1202 that are selected the second and subsequent times and corrects the pixel signals of the effective pixel region 1203. The first correction circuit averages pixel signals of the first ineffective pixel region 1201 and the second ineffective pixel region 1202 for each of a plurality of regions (for example, three regions) into which the ineffective pixel regions are horizontally divided. The second correction circuit averages pixel signals of the second ineffective pixel region 1202 for each of a plurality of regions into which the second ineffective pixel region 1202 is horizontally divided by a dividing number that is larger than the number of divisions of the first correction circuit.

According to the present embodiment, although the number of pixels of the ineffective pixel region that is averaged is two rows, the effect of the present embodiment does not change even when the number of rows is increased to a degree that does not exert space-related pressure on the chip area. By adopting a configuration in which the rows of an ineffective pixel region having a plurality of rows are each read out a plurality of times to increase the read-out averaging parameters, an average value of an even higher accuracy can be calculated.

According to the present embodiment, the ineffective pixel region is composed of light shielded pixels in which the pixel surface of a circuit configuration that is the same as the effective pixel region is covered with a light-shielding film such as aluminum. However, with respect to the pixels of the second ineffective pixel region, even when an average value is calculated by taking pixel signals that receive the influence of dark current as null pixels that do not form a semiconductor impurity region for accumulating a charge as one row, and taking pixel signals that receive almost no influence from dark current as five rows, the effect of the present embodiment does not change.

Third Embodiment

Although the third embodiment of the present invention resembles the first embodiment, a timing chart illustrating the operations of the solid-state imaging apparatus with respect to ineffective pixel regions that are repeatedly read out is different from the first embodiment. Hereunder, the present embodiment is described in detail using the drawings.

Figure 13:
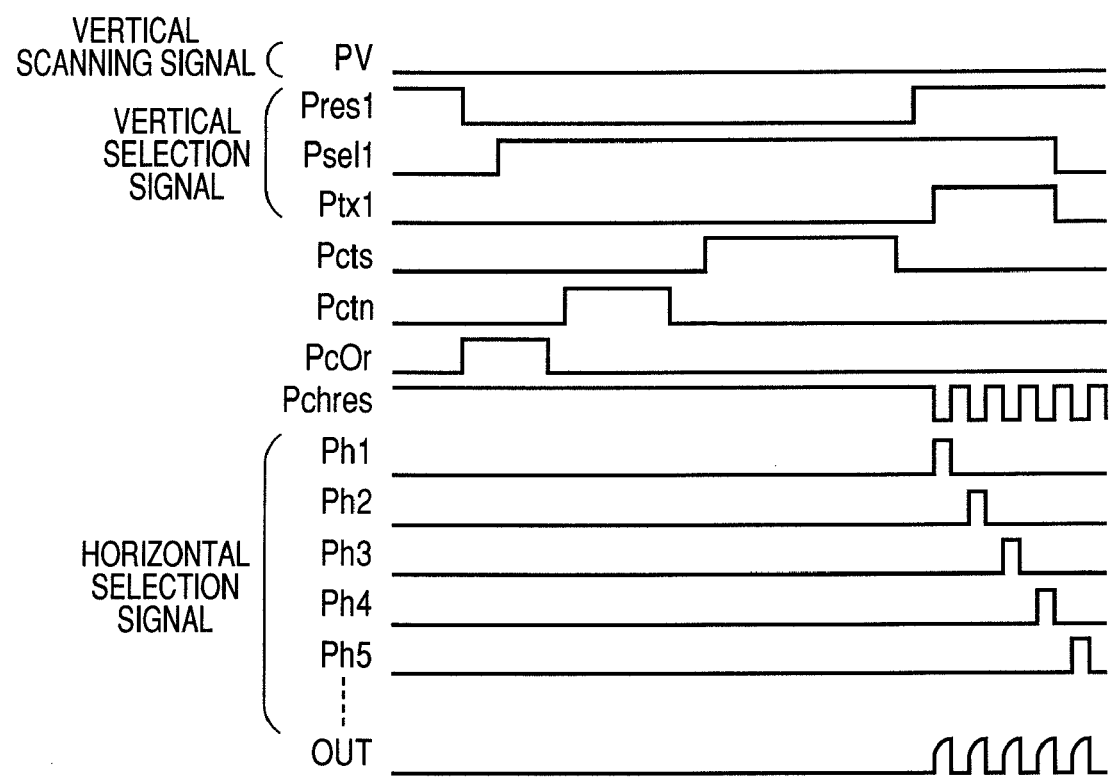
FIG. 13 is a timing chart of a solid-state imaging apparatus relating to a third embodiment of the present invention.

FIG. 9 is a timing chart that illustrates the operations of the solid-state imaging apparatus relating to the third embodiment of the present invention. According to the present embodiment, the ineffective pixel region 102 shown in FIG. 1 is provided as two rows at the top in the vertical direction of the pixel unit 100. In order to output the pixel signals of the second row of the ineffective pixel region having two rows disposed at the top of the pixel unit over five horizontal scanning time periods, a row selection signal Pv2 that selects the second row is a signal that outputs five horizontal scanning time periods. To generate this row selection signal Pv2, as shown in FIG. 13, the vertical scanning signal PV is set at low level during 3 to 6 horizontal scanning time periods and shift operations of the shift register circuit shown in FIG. 5 are stopped. Thus, pixel signals of the second row are repeatedly output over five horizontal scanning time periods. The operations for the second row that is repeatedly read out differ only in the respect that a light signal charge is not transferred to the amplification MOS transistor 203 by the selection signal Ptx1. The pixel signals that are read out at the timings shown in FIG. 13 are black level output that do not depend on dark current generated at the photodiode.

Thereafter, by repeating the operations of the timing chart shown in FIG. 4A once more, pixel signals connected to the third and subsequent rows are sequentially read out by means of a signal from the vertical scanning circuit to complete read out of all pixels.

A period from the start of an operation to read out pixel signals of the first row that comprises the pixel unit until completing read out of pixel signals of the last row in this manner is defined as one frame period.

Since a method that suppresses fixed pattern noise of the effective pixel region using pixel signals of the ineffective pixel region is the same as the method described in the first embodiment, a description thereof is omitted here.

According to the present embodiment, pixels of an ineffective pixel region may include null pixels that do not form a semiconductor impurity region for accumulating a charge, light shielded pixels in which the pixel surface of a circuit configuration that is the same as the effective pixel region is covered with a light-shielding film such as aluminum, and pixels of a circuit configuration that is the same as the effective pixel region.

Fourth Embodiment

Although the fourth embodiment of the present invention resembles the first embodiment, a timing chart illustrating the operations of the solid-state imaging apparatus with respect to ineffective pixel regions that are repeatedly read out is different from the first embodiment. Hereunder, the present embodiment is described in detail using the drawings.

Figure 14:
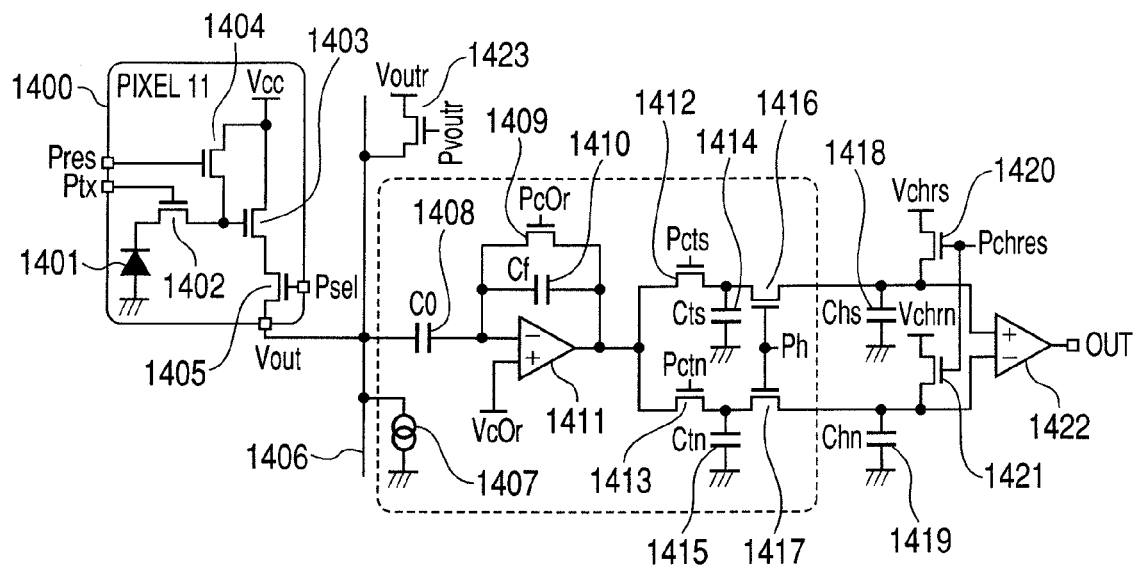
FIG. 14 is a circuit diagram of a pixel, a readout circuit, and a common output circuit of a solid-state imaging apparatus relating to a fourth embodiment of the present invention.
Figure 15:
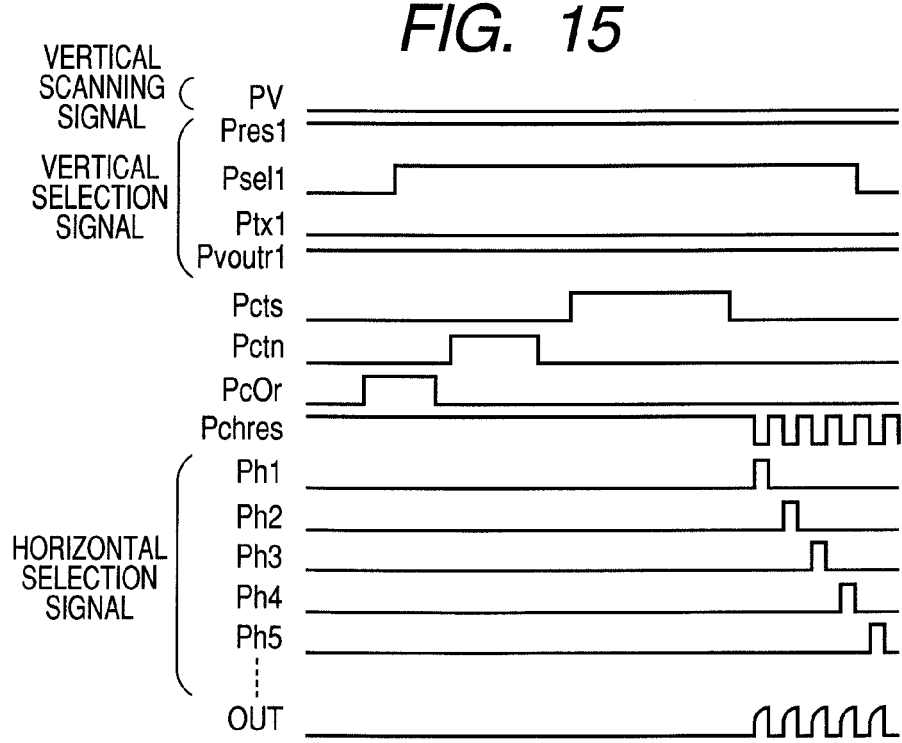
FIG. 15 is a timing chart of a solid-state imaging apparatus relating to the fourth embodiment of the present invention.

FIG. 14 is a circuit diagram of a pixel, a readout circuit, and a common output circuit of a solid-state imaging apparatus relating to the fourth embodiment of the present invention. The difference between the present embodiment and the first to third embodiments is that a MOS transistor switch 1423 is provided for resetting the voltage level of a vertical signal line 1406 to a reference voltage Voutr. A MOS transistor switch 1423 is provided for each vertical signal line 1406, and is a switch for connecting the vertical signal line 1406 to the reference voltage Voutr. FIG. 15 illustrates the operation timing for a row of an ineffective pixel region that is repeatedly read out.

Since it is not necessary to read out a charge that is generated at a photodiode 1401, a gate Pres1 of a reset MOS transistor 1404 is maintained at high level. As a result, the gate of the amplification MOS transistor 1403 is continually reset to the reset power supply voltage. The vertical signal line 1406 is reset to the reset voltage Voutr by setting a gate Pvoutr1 of the MOS transistor switch 1423 to high level. At this time, after a gate Pc0r of a clamp switch 1409 changes to high level, a gate Psel1 of a selection MOS transistor 1405 changes to high level such that the reset signal Voutr is clamped by a clamp capacitor 1408 (C0) of each column. Next, after the gate Pc0r of the clamp switch 1409 returns to low level, a gate Pctn of the N-side transfer switch 1413 changes to high level and reset signals are held in noise holding capacitors 1415 (Ctn) provided in each column. Subsequently, the gate Pctn of the N-side transfer switch 1413 changes to low level and the gate Pcts of the S-side transfer switch 1412 changes to high level. Next, the gate Pcts of the S-side transfer switch 1412 changes to low level. As a result, a reset signal is once more read out to the signal holding capacitor 1414 (Cts) provided in each column. By the operations up to this point, a reset signal connected to a first row is held in signal holding capacitors 1414 and 1415 (Ctn and Cts) connected to the respective columns. A constant current source 1407 is connected to the vertical signal line 1406. A feedback capacitor 1410 is connected between the input and output of an amplifier 1411.

After pixel signals are held at the signal holding capacitors 1414 and 1415, gates of horizontal transfer switches 1416 and 1417 of each column are sequentially changed to a high level by a signal Ph1 supplied from the horizontal scanning circuit. Voltages being held at the signal holding capacitors 1414 and 1415 (Cts and Ctn) are sequentially read out to horizontal output line capacitors 1418 and 1419 (Chs and Chn), subjected to differential processing at an output amplifier 1422, and output in sequence to an output terminal OUT. During an interval between read out of signals of each column the horizontal output line capacitors 1418 and 1419 (Chs and Chn) are reset to reset voltages Vchrs and Vchrn by reset switches 1420 and 1421. Thus, read out of pixels connected in the first row is completed.

According to the present embodiment, since the same charge in accordance with reset voltage Voutr of the vertical signal line 1406 is held in the two signal holding capacitors 1414 and 1415, a black level signal that undergoes differential processing at the output amplifier 1422 is output to the output terminal OUT.

Thereafter, by repeating the operations of the timing chart shown in FIG. 4A once more, pixel signals connected to the third and subsequent rows are sequentially read out by means of a signal from the vertical scanning circuit to complete read out of all pixels.

A period from the start of an operation to read out pixel signals of the first row that comprises the pixel unit until completing read out of pixel signals of the last row in this manner is defined as one frame period.

Since a method that suppresses fixed pattern noise of the effective pixel region using pixel signals of the ineffective pixel region is the same as the method described in the first embodiment, a description thereof is omitted here.

Fifth Embodiment

Although the fifth embodiment of the present invention resembles the first embodiment, a timing chart illustrating the operations of the solid-state imaging apparatus and a method of suppressing fixed pattern noise using pixel signals of an ineffective pixel region are different from the first embodiment. Hereunder, the present embodiment is described in detail using the drawings.

Figure 16:
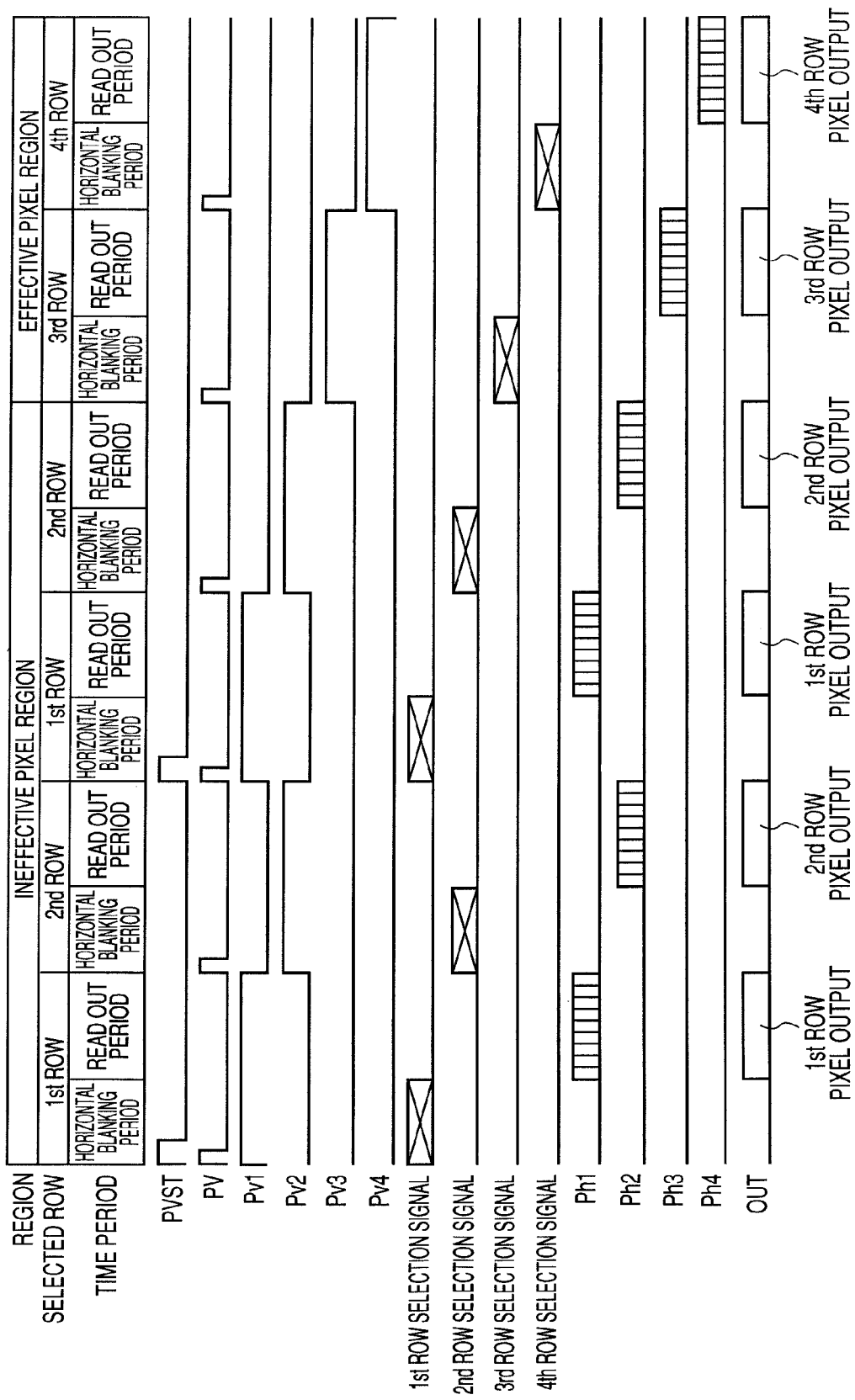
FIG. 16 is a timing chart of a solid-state imaging apparatus relating to a fifth embodiment of the present invention.

FIG. 16 is a timing chart that illustrates operations of the solid-state imaging apparatus relating to the fifth embodiment of the present invention. According to the present embodiment, the ineffective pixel region 102 shown in FIG. 1 is provided as two rows at the top in the vertical direction of the pixel unit 100. In order to output pixel signals of the ineffective pixel region having two rows at the top of the pixel unit two rows at a time, a row selection signal Pv1 that selects the first row and a row selection signal Pv2 that selects the second row are signals that output the amount of two rows. According to the present embodiment, by inputting a vertical scanning start signal PVST as a start signal of the vertical scanning circuit shown in FIG. 5 once more after output of a row selection signal for the second row, the row selection signal is returned to the first row.

Figure 17:
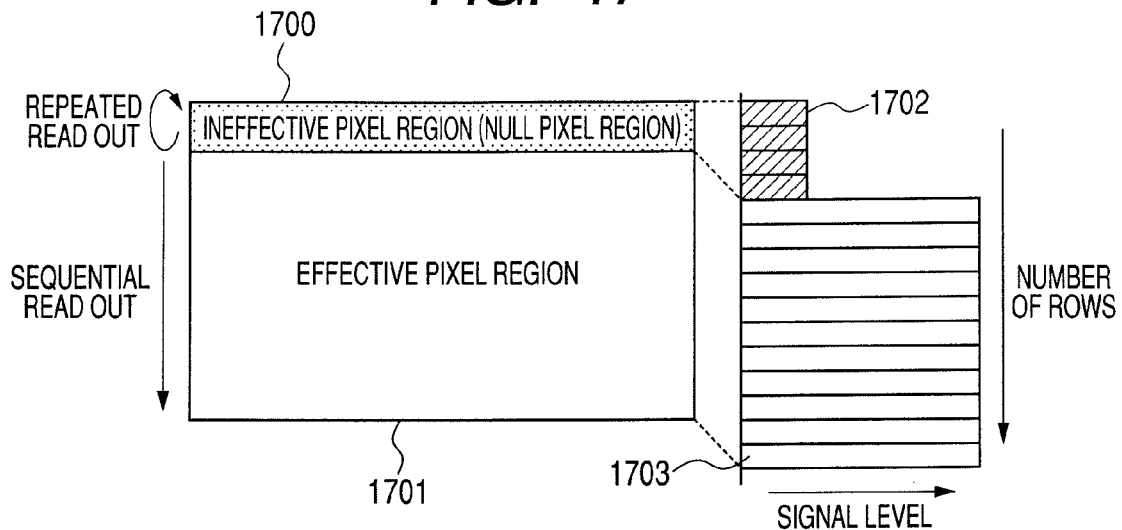
FIG. 17 is a conceptual diagram that describes signal levels of pixel signals of the solid-state imaging apparatus relating to the fifth embodiment of the present invention.

FIG. 17 is a conceptual diagram that describes a signal level of read-out pixel signals of the solid-state imaging apparatus relating to the present embodiment. According to the present embodiment, pixels of an ineffective pixel region 1700 are composed of null pixels that do not form a semiconductor impurity region for accumulating a charge. The ineffective pixel region 1700 consists of two rows. Since pixel signals 1702 of the ineffective pixel region 1700 are null pixel signals, they constitute a signal level that serves as a standard for the black level of a captured image. By reading out the pixel signals of the ineffective pixel region that originally has only two rows at the timings shown in FIG. 16, the number of pixel signals can be increased to that of four rows and read out. After reading out null pixel signals 1702 of an amount equivalent to four rows, output of row selection signals starts once more to thereby output effective pixel signals 1703 of the effective pixel region 1701 that outputs signals in which charges generated according to incident light are accumulated.

Thereafter, by repeating the operations of the timing chart shown in FIG. 4A once more, pixel signals connected to the second and subsequent rows are sequentially read out by means of a signal from the vertical scanning circuit to complete read out of all pixels.

A period from the start of an operation to read out pixel signals of the first row that comprises the pixel unit until completing read out of pixel signals of the last row in this manner is defined as one frame period.

Since a method that suppresses fixed pattern noise of the effective pixel region 1701 using pixel signals of the ineffective pixel region 1700 is the same as the method described in the first embodiment, a description thereof is omitted here.

Sixth Embodiment

Hereunder, a sixth embodiment of the present invention is described in detail using the drawings.

Figure 18:
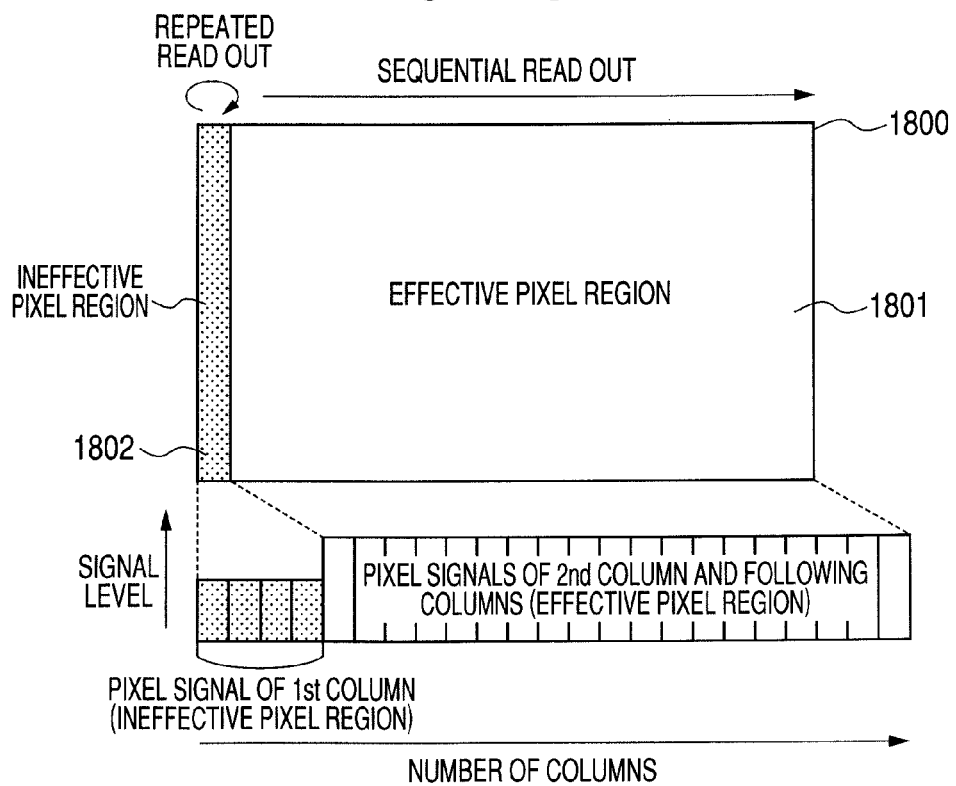
FIG. 18 includes a plan view of a solid-state imaging apparatus relating to a sixth embodiment of the present invention and a conceptual diagram that describes signal levels of read-out pixel signals.

FIG. 18 includes a plan view of a pixel unit of a solid-state imaging apparatus relating to the sixth embodiment of the present invention and a conceptual diagram that describes signal levels of read out pixel signals. The solid-state imaging apparatus of the present embodiment has a pixel unit 1800 that includes an effective pixel region 1801 having a plurality of pixels that accumulates charges generated according to incident light to output a signal, and an ineffective pixel region 1802 having a plurality of pixels that outputs a signal that is not dependent on incident light. According to the present embodiment, pixel signals of the ineffective pixel region 1802 disposed in one column at the start in the horizontal direction of the pixel unit 1800 are repeatedly read out four times in one horizontal scanning time period.

Since the block diagram and the circuit configuration of the solid-state imaging apparatus relating to the present embodiment are the same as in the first embodiment, a detailed description is omitted here.

Figure 19:
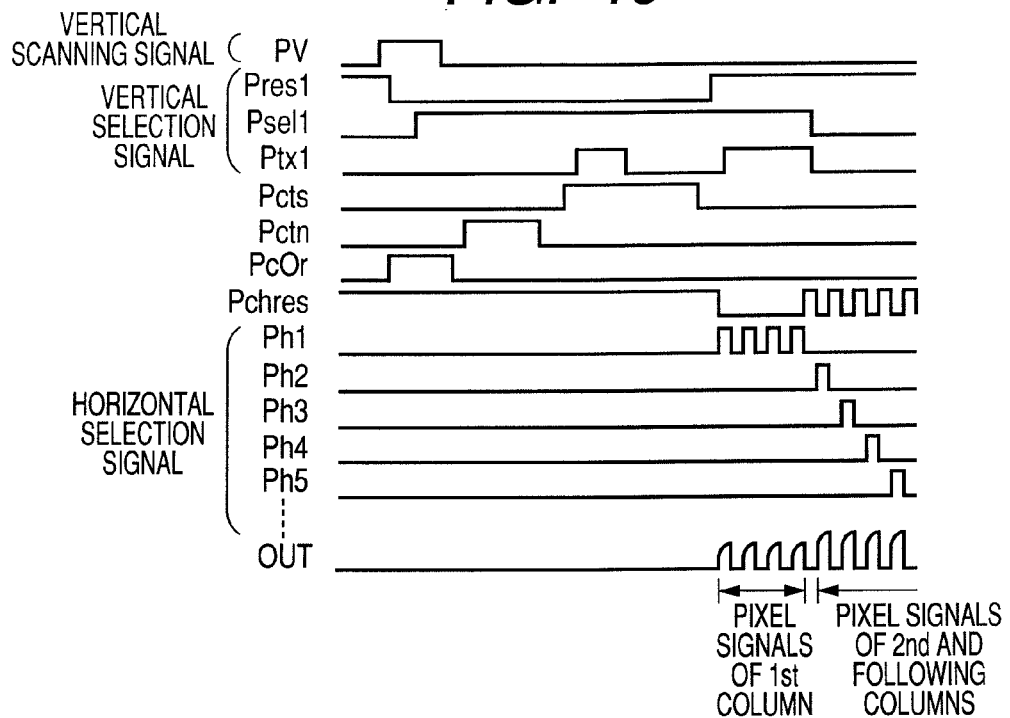
FIG. 19 is a timing chart of a solid-state imaging apparatus relating to a sixth embodiment of the present invention.

FIG. 19 is a timing chart for one horizontal scanning time period of the solid-state imaging apparatus relating to the present embodiment. By repeatedly selecting a total of four times a horizontal selection signal Ph1 that selects the first column and sequentially selecting the second and subsequent columns with horizontal selection signals Ph2 to Ph5, it is possible to read out only the pixel signals of the first column four times. At this time, by fixing a reset signal Pchres of the signal holding capacitor to low level while selecting the first column, it is possible to execute read out a plurality of times while holding pixel signals of the first column in the signal holding capacitor.

In FIG. 8, a block diagram is shown that includes a pixel signal correction circuit of a solid-state imaging apparatus relating to the present embodiment, with the exception of the pixel unit 800. In FIG. 18, a pixel unit 1800 is provided instead of the pixel unit 800. Analog pixel signals output from the readout circuit 804 by the aforementioned operations are digitized by an AD convertor 806. The averaging circuit 807 calculates a row average value for pixel signals of ineffective pixels that are increased to an amount equivalent to four columns. The calculated row average value is stored in the memory 808. The stored row average value is subtracted from pixel signals of the effective pixel region 802 at the subtracter 809. By performing the above described row average value calculating operation and subtraction processing in a similar manner in sequential row units, fixed pattern noise having a horizontal stripe shape that occurs in each column can be accurately suppressed.

As described above, according to the present embodiment the horizontal scanning circuit 805 selects the same pixels of the pixel unit 1800 a plurality of times during one horizontal scanning time period. More specifically, the horizontal scanning circuit 805 selects the same pixels of the ineffective pixel region 1802 a plurality of times during one horizontal scanning time period. For example, the horizontal scanning circuit 805 selects the same pixels four times. A semiconductor impurity region for accumulating a charge is formed in pixels of the effective pixel region 1801. In contrast, a semiconductor impurity region for accumulating a charge is not formed in pixels of the ineffective pixel region 1802. The correction circuit has the averaging circuit 807, the memory 808, and the subtracter 809. The correction circuit corrects pixel signals of the effective pixel region 1801 using the pixel signals that are selected a plurality of times and output by the horizontal scanning circuit 805. More specifically, the correction circuit averages the pixel signals that are selected a plurality of times and corrects the pixel signals of the effective pixel region 1801.

According to the present embodiment, pixels of the ineffective pixel region may include light shielded pixels in which the pixel surface of a circuit configuration that is the same as the effective pixel region is covered with a light-shielding film such as aluminum or may include null pixel that do not form a semiconductor impurity region for accumulating a charge.

According to the present embodiment, although the number of pixels of the ineffective pixel region that is averaged is one column, the effect of the present embodiment does not change even when the number of columns is increased to a degree that does not exert space-related pressure on the chip area. By adopting a configuration in which the columns of an ineffective pixel region having a plurality of columns are each read out a plurality of times to increase the averaging parameters that are read out, an average value of an even higher accuracy can be calculated.

Seventh Embodiment

Figure 20:
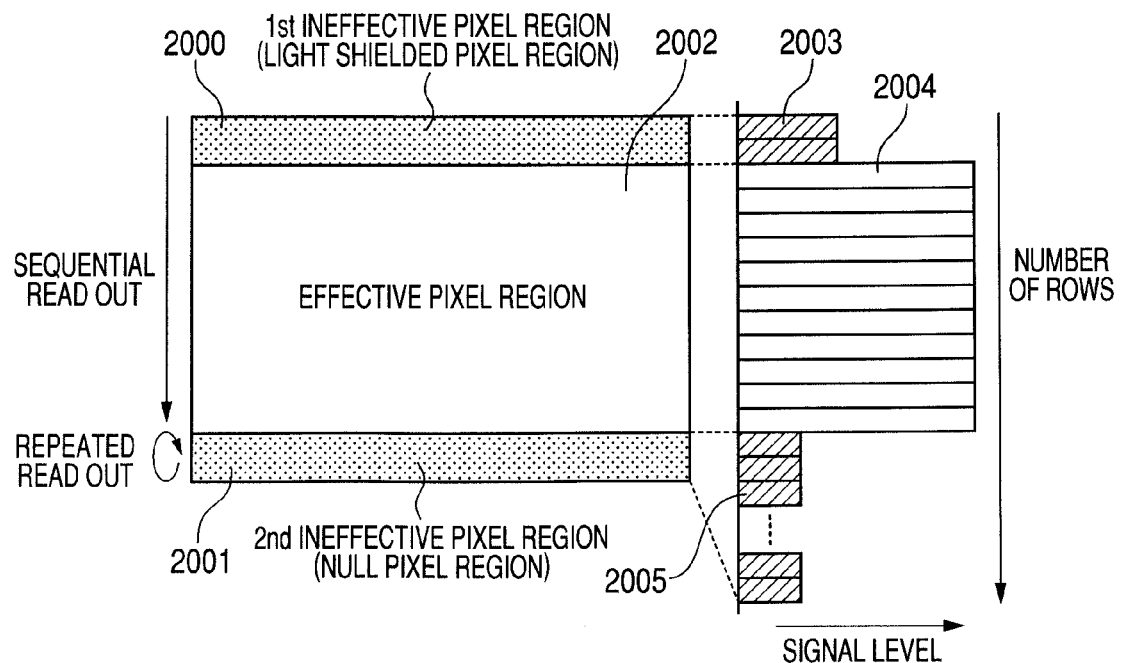
FIG. 20 is a conceptual diagram that describes signal levels of pixel signals of a solid-state imaging apparatus relating to a seventh embodiment of the present invention.

FIG. 20 includes a plan view of a pixel unit of a solid-state imaging apparatus relating to the seventh embodiment of the present invention and a conceptual diagram that describes signal levels of read out pixel signals. The solid-state imaging apparatus of the present embodiment includes three pixel regions: an effective pixel region 2002 that accumulates charges generated according to incident light to output signals, a first ineffective pixel region 2000, and a second ineffective pixel region 2001. The first ineffective pixel region 2000 is composed of light shielded pixels in which the pixel surface of a circuit configuration that is the same as the effective pixel region 2002 is covered with a light-shielding film such as aluminum. The second ineffective pixel region 2001 is composed of null pixels that do not form a semiconductor impurity region for accumulating a charge.

Since the pixel signals of the first ineffective pixel region 2000 having two rows are light-shielded pixel signals, a pixel signal level 2003 that receives the influence of a dark current that depends on temperature or accumulation time is output. Since the pixel signals of the second ineffective pixel region 2001 having two rows are null pixel signals, a signal level 2005 that serves as a standard for the black level of a captured image is output. FIG. 20 also illustrates pixel signal levels 2004 of the effective pixel region 2002.

Figure 21:
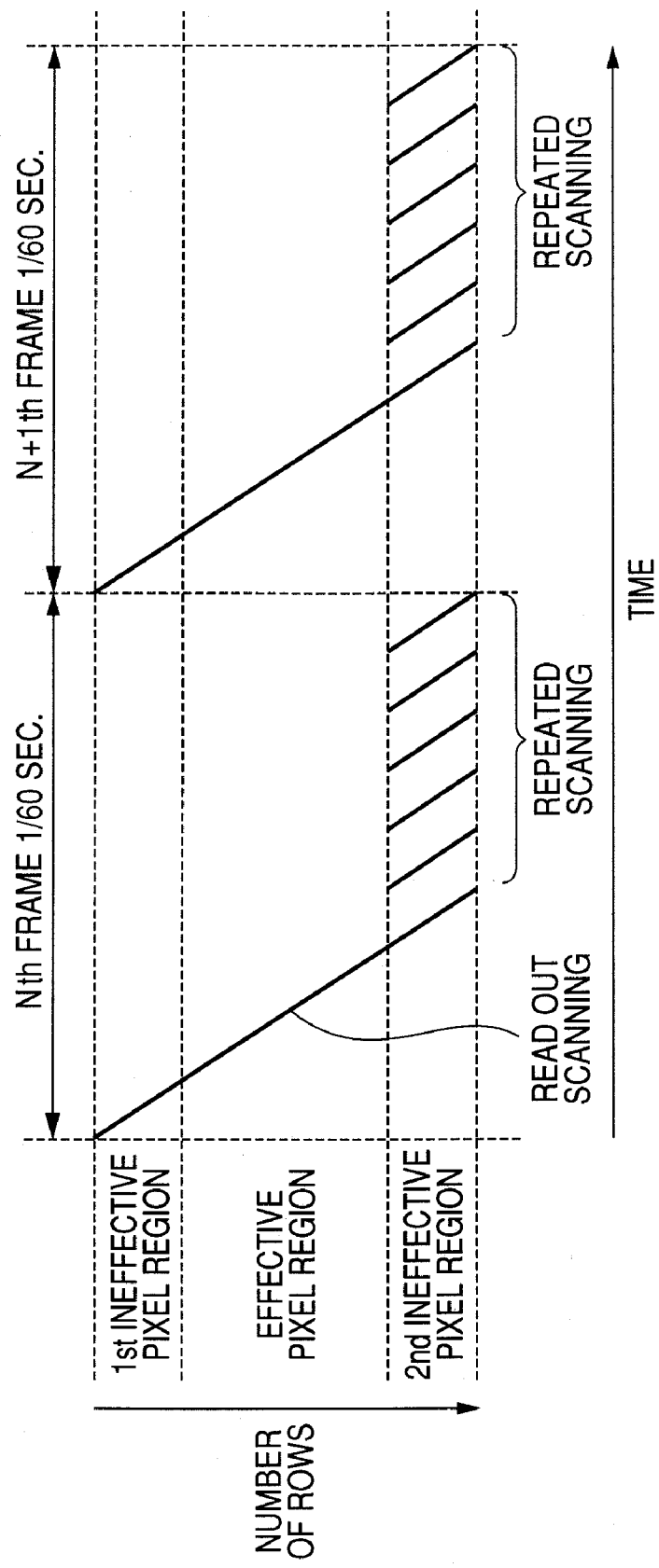
FIG. 21 is a conceptual diagram that represents a method of reading out pixel signals of the solid-state imaging apparatus relating to the seventh embodiment of the present invention.

FIG. 21 is a conceptual diagram that represents a driving method of the solid-state imaging apparatus relating to the present embodiment, that performs a so-called focal-plane shutter operation. The time of one frame is, for example, 1/60 seconds. Although in FIG. 21 an accumulation time for the first ineffective pixel region 2000 and the effective pixel region 2002 is one frame (1/60 seconds), the effect of the present embodiment does not change even when an accumulation time of equal to or less than one frame is realized by separately performing a read-out scan and a reset scan. According to this embodiment, pixel signals are read out in the order of first ineffective pixel region 2000→effective pixel region 2002→second ineffective pixel region 2001. In a case in which the period of one frame is fixed, such as when imaging a moving image, a large number of null pixel signals can be acquired by repeatedly reading out the second ineffective pixel region 2001 a plurality of times in surplus time after reading the effective pixel region 2002. According to FIG. 21, for example, null pixel signals equivalent to the amount for 12 rows can be acquired by repeatedly scanning the second ineffective pixel region 2001 that has only two rows six times during one frame.

According to the present embodiment, since the second ineffective pixel region 2001 is repeatedly read out a plurality of times in surplus time after reading out the effective pixel region 2002, it is possible to increase the null pixel signal parameters to be averaged while maintaining the frame rate to thereby acquire highly accurate correction data.

Further, the effect of the present embodiment does not change even when null pixel signal parameters to be averaged are further increased to acquire highly accurate correction data by averaging acquired null pixel signals over a plurality of frames.

Figure 22:
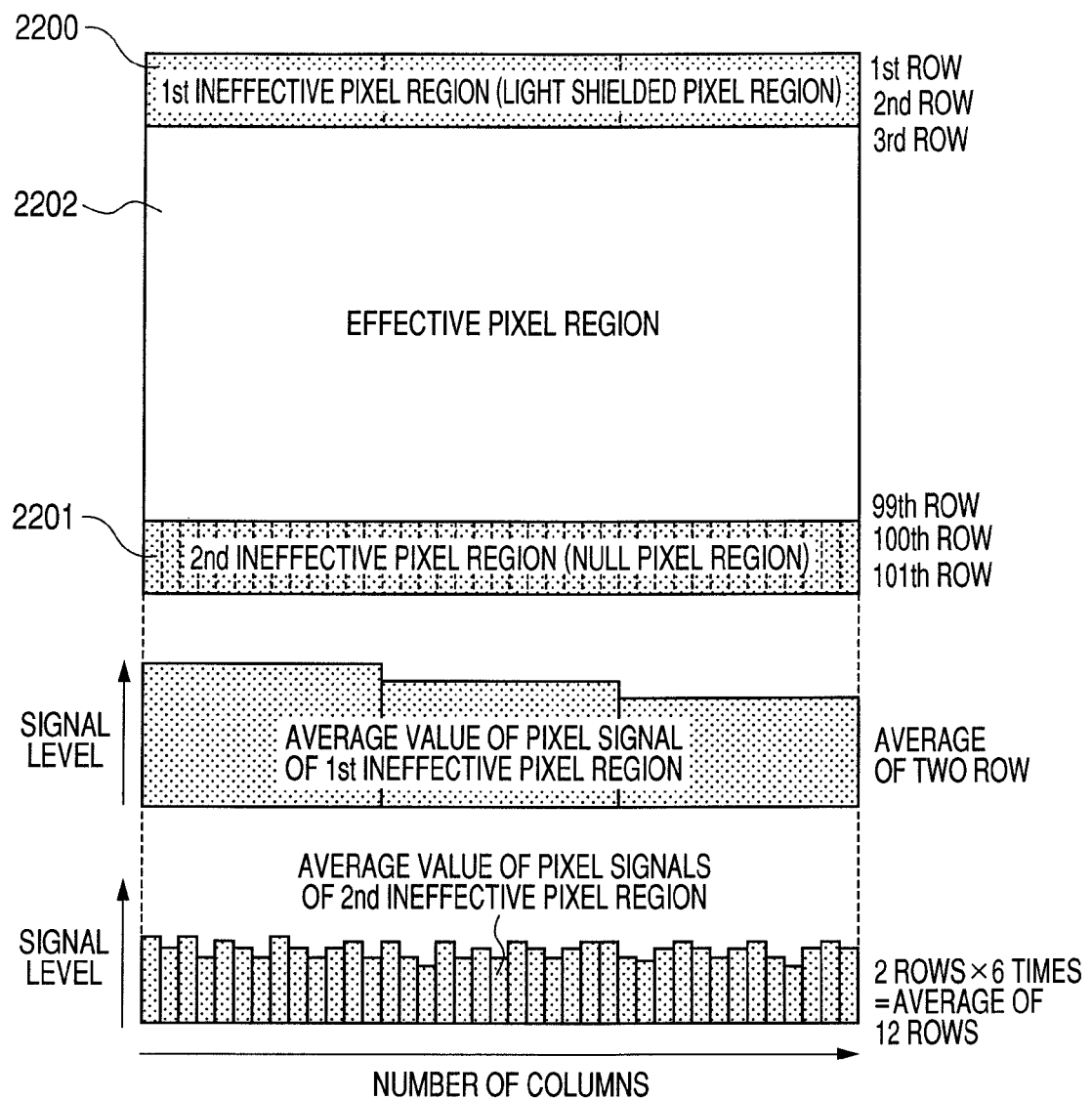
FIG. 22 is a conceptual diagram that illustrates the relation between average value calculation regions and average values of read-out signals in the solid-state imaging apparatus relating to the seventh embodiment of the present invention.

FIG. 22 is a conceptual diagram that shows the correlation between an average value calculation region and an average value of pixel signals that are read out by the solid-state imaging apparatus relating to the present embodiment. To simplify the description, the first ineffective pixel region 2200 is set as two rows, the effective pixel region 2202 is 98 rows, and the second ineffective pixel region 2201 is two rows. For the first ineffective pixel region 2200, an average value is calculated for each of three regions obtained by horizontally dividing the rows into three. For the second ineffective pixel region 2201, an average value is calculated for each column.

Figure 23:
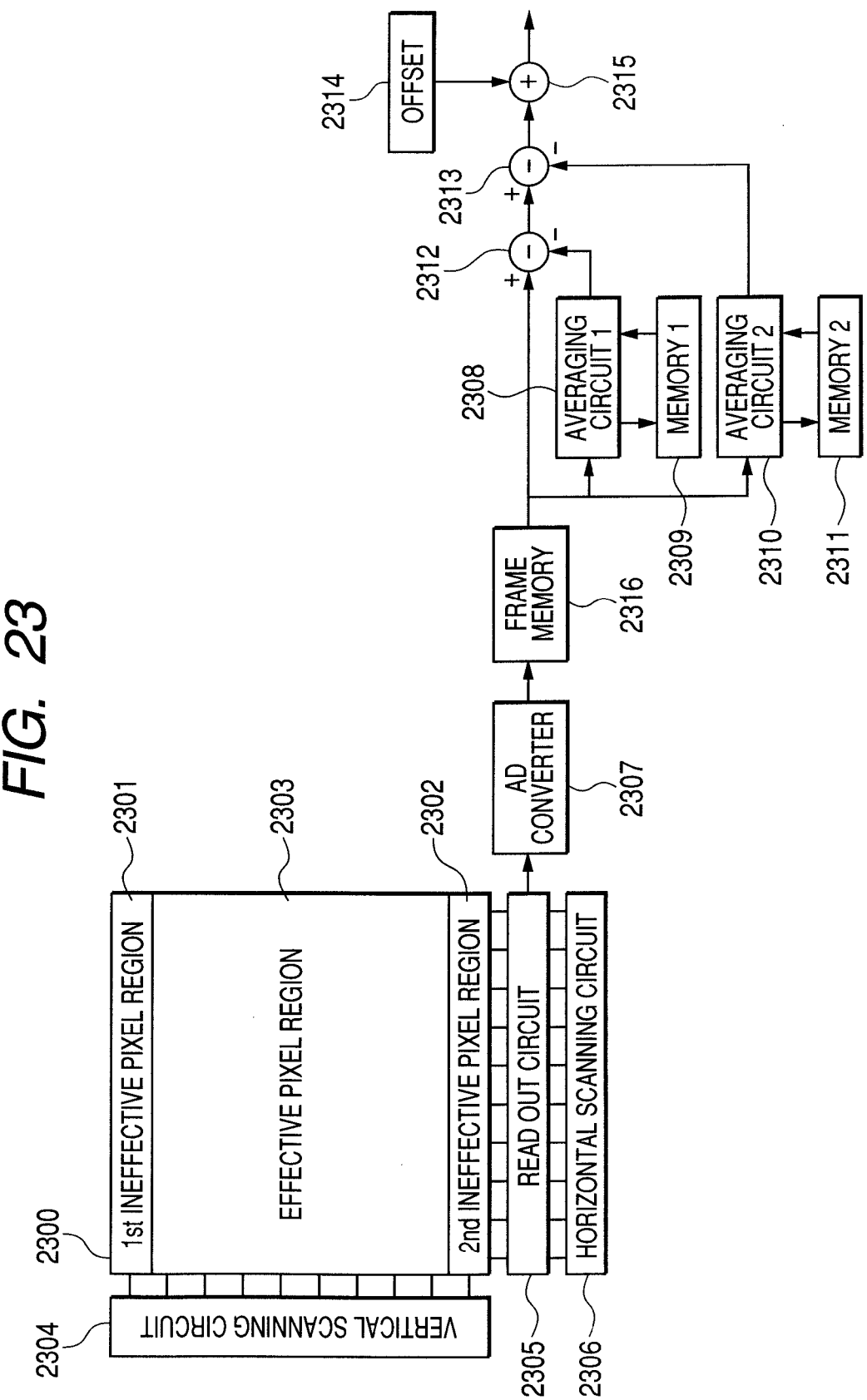
FIG. 23 is a configuration diagram of an imaging system that uses the solid-state imaging apparatus relating to the seventh embodiment of the present invention.

FIG. 23 is a block diagram that includes a pixel signal correction circuit of the solid-state imaging apparatus relating to the present embodiment. Similarly to FIG. 12, the configuration illustrated in FIG. 23 includes a pixel unit 2300, a first ineffective pixel region 2301, a second ineffective pixel region 2302, an effective pixel region 2303, a vertical scanning circuit 2304, a readout circuit 2305, and a horizontal scanning circuit 2306.

As described above, after selecting the last row of the second ineffective pixel region 2302, the vertical scanning circuit 2304 selects the first row of the second ineffective pixel region 2302 once again to sequentially scan the rows of the second ineffective pixel region 2302. As a result, the vertical scanning circuit 2304 repeatedly scans the second ineffective pixel region 2302. As illustrated in FIG. 21, the vertical scanning circuit 2304 repeatedly scans the second ineffective pixel region 2302 during the period from completing scanning of the effective pixel region 2303 of the Nth frame until the start of scanning of the effective pixel region 2303 of the N+1 frame.

Pixel signals output from the readout circuit 2305 by the aforementioned operations are digitized by an AD convertor 2307. The digitized pixel signals are stored in a frame memory 2316 and at the appropriate time are read out by a first averaging circuit 2308, a second averaging circuit 2310, and a subtracting circuit 2312.

Average values of pixel signals of the first ineffective pixel region 2301 (pixel signals of first row to second row=pixel signals written in first row to second row of frame memory) that are read out from the frame memory 2316 are calculated by the first averaging circuit 2308. At the first averaging circuit 2308, as shown in FIG. 22, an average value is calculated for each of three regions obtained by horizontally dividing the first ineffective pixel region 2301 in three, and the calculated average values are stored in a first memory 2309. Unlike a method that performs averaging for each column, since a large number of averaging parameters are obtained by calculating average values for each of a plurality of regions that include a plurality of pixels, a highly accurate average value can be acquired even from a pixel region that includes as few as two rows.

The average values of pixel signals of the second ineffective pixel region 2302 (pixel signals of 100th row to 101st row×6 times=pixel signals written in 100th row to 111th row of frame memory) that are read out from the frame memory 2316 are calculated by the second averaging circuit 2310. As shown in FIG. 22, the second averaging circuit 2310 calculates an average value for each column and stores the calculated values in a second memory 2311. Since averaging is performed for each column, pixel signals for 12 rows are used according to the present embodiment to increase the averaging parameters.

Next, the two average values that are calculated are respectively subtracted at subtracting circuits 2312 and 2313 from the pixel signals of the effective pixel region 2303 (pixel signals of 3rd row to 99th row=pixel signals written in 3rd row to 99th row of frame memory) of the frame memory 2316. As illustrated in FIG. 23, for the purpose of cancelling out the effect of subtracting two average values, an adding circuit 2315 may add an offset 2314 for black level adjustment to the output signal of the subtracting circuit 2313.

The ineffective pixel region includes the first ineffective pixel region 2301 and the second ineffective pixel region 2302 which consist of mutually different rows. The pixels of the first ineffective pixel region 2301 are light shielded pixels in which the surface of pixels in which a semiconductor impurity region for accumulating a charge is formed is covered with a light-shielding film. The pixels of the second ineffective pixel region 2302 are pixels in which a semiconductor impurity region for accumulating a charge is not formed. The vertical scanning circuit 2304 selects pixels of the same row of the effective pixel region 2303 in row units one time during one frame and selects pixels of the same row of the second ineffective pixel region 2302 in row units a plurality of times during one frame. The correction circuit has a first correction circuit and a second correction circuit. The first correction circuit has the first averaging circuit 2308 and the subtracting circuit 2312. The first correction circuit averages pixel signals of the first ineffective pixel region 2301 to correct the pixel signals of the effective pixel region 2303. The second correction circuit has the second averaging circuit 2310 and the subtracting circuit 2313. The second correction circuit averages pixel signals of the second ineffective pixel region 2302 to correct the pixel signals of the effective pixel region 2303.

According to the above described method, it is possible to accurately suppress fixed pattern noise occurring in each column as well as the influence of dark current of the solid-state imaging apparatus.

According to the present embodiment, the effects produced by dark current of the solid-state imaging apparatus are suppressed by performing subtraction processing for pixel signals of the effective pixel region 2303 using pixel signals of the first ineffective pixel region 2301 that are digitized by the AD convertor 2307. Instead, a configuration may be adopted in which dark current components included in pixel signals after A/D conversion by the AD convertor 2307 are suppressed using pixel signals of the first ineffective pixel region 2301 for black level adjustment of the AD convertor 2307.

Although according to the present embodiment pixel signals that are digitized by the AD convertor 2307 are temporarily stored in the frame memory 2316, a configuration may be adopted in which the frame memory 2316 is eliminated. For example, according to a focal plane readout operation as illustrated in FIG. 21, pixel signals of the second ineffective pixel region 2302 of the Nth frame are averaged by the second averaging circuit 2310 and stored in the first memory 2309. Subsequently, pixel signals of the first ineffective pixel region 2301 of the N+1 frame are averaged by the first averaging circuit 2308 and stored in the second memory 2311. If the two average values that are obtained are subtracted from the pixel signals of the effective pixel region 2303 of the N+1 frame, the frame memory 2316 can be omitted.

As described in the foregoing, according to the first to fifth embodiments, even when there is only a small number of rows in an ineffective pixel region for averaging, by selecting a vertical selection signal over a plurality of row periods during one frame, pixel signals thereof can be output for a plurality of rows. By averaging pixel signals that are output over a plurality of row periods to calculate a correction signal, the influence of random noise included in the correction signal can be reduced. The same applies to the sixth and seventh embodiments. Further, since it is not necessary to have a large number of rows in an ineffective pixel region as in the prior art, the chip area can be reduced.

Further, since it is not necessary to average pixel signals of an ineffective pixel region over a plurality of frames as in the prior art, fixed pattern noise can be suppressed to a high degree of accuracy even in an imaging mode that captures only a single frame such as the case of a single image captured with a digital still camera.

It should be understood that the above described embodiments merely describe specific examples for implementing the present invention and are not intended to limit the technical scope of the present invention. That is, the present invention may be implemented in various forms without departing from the technical concept and principal features thereof.

This application claims the benefit of Japanese Patent Application No. 2007-134495, filed May 21, 2007, and Japanese Patent Application No. 2007-337461, filed Dec. 27, 2007, which are hereby incorporated by reference herein in their entirety.

What is claimed is:

1. An imaging apparatus comprising:
   a pixel unit including an effective pixel region of a plurality of pixels, and an ineffective pixel region of a plurality of pixels;
   a plurality of vertical signal lines;
   a vertical scanning circuit for selecting row by row, or rows by rows, the pixels of the pixel unit, such that signals of the selected pixels are outputted to the plurality of vertical signal lines; and
   a correction circuit for correcting a signal of a pixel in the effective pixel region based on the signal of the pixel selected at plural times and outputted, wherein
   the ineffective pixel region includes first and second ineffective pixel regions of mutually different rows,
   the vertical scanning circuit selects at plural times pixels of a same row of the second ineffective pixel region during one frame time period, and selects at one time pixels of a same row of the first ineffective pixel region during the one frame time period, and
   the correction circuit includes a first correction circuit for averaging signals of the pixels in the first and second ineffective pixel regions selected at a first time and correcting signals of the pixels in the effective pixel region, and a second correction circuit for averaging signals of the pixels in the second ineffective pixel region selected at a second time and following times and correcting the signals of the pixels in the effective pixel region.

2. The imaging apparatus according to claim 1, wherein the vertical scanning circuit repeats selecting of the ineffective pixel region, such that, after selecting a last row of the ineffective pixel region, again, the vertical scanning circuit selects a first row of the ineffective pixel region, and sequentially scans the rows of the ineffective pixel region.

3. The imaging apparatus according to claim 1, wherein the vertical scanning circuit repeats scanning of the ineffective pixel region, during a time period after completing scanning of the effective pixel region of an N-th frame and before a start of scanning of the effective pixel region of an N+1-th frame.

4. The imaging apparatus according to claim 1, further comprising a switch arranged for each of the vertical signal lines, for connecting a corresponding vertical signal line to a reference voltage.

5. The imaging apparatus according to claim 1, wherein a semiconductor region doped with an impurity for accumulating carriers is arranged in a pixel in the effective pixel region and a pixel in the first ineffective pixel region, and the semiconductor region doped with the impurity for accumulating carriers is not arranged in a pixel in the second ineffective pixel region.

6. The imaging apparatus according to claim 1, wherein the correction circuit averages the signal of the pixel selected at the plural times, and corrects the signal of the pixel in the effective pixel region.

7. The imaging apparatus according to claim 1, wherein a pixel in the first ineffective pixel region is a light shielded pixel that includes a semiconductor region doped with an impurity for accumulating carriers and shielded with a light shielding film at a surface thereof, and a pixel in the second ineffective pixel region is a pixel in which the semiconductor region for accumulating carriers is not formed.

8. The imaging apparatus according to claim 1, wherein
the first and second ineffective pixel regions are divided into plural regions along a horizontal direction, and the first correction circuit averages signals of pixels in the first and second ineffective pixel regions divided region by divided region, and
the second ineffective pixel region is divided into plural regions, along the horizontal direction, of a larger number than a number of regions into which the first and second pixel regions are divided, and the second correction circuit averages signals of pixels in the second ineffective pixel region divided region by divided region of the larger number.

9. A processing method of an imaging apparatus that includes:
a pixel unit including an effective pixel region of a plurality of pixels, and an ineffective pixel region of a plurality of pixels,
a plurality of vertical signal lines,
a vertical scanning circuit for selecting row by row, or rows by rows, the pixels of the pixel unit, such that signals of the selected pixels are outputted to the plurality of vertical signal lines, and
a correction circuit for correcting a signal of a pixel in the effective pixel region based on the signal of the pixel selected at plural times and outputted,
wherein the ineffective pixel region includes first and second ineffective pixel regions of mutually different rows,
the method comprising steps of:
selecting at a single time row by row, or rows by rows, pixels of a same row of the effective pixel region during a one frame time period by the vertical scanning circuit;
selecting at plural times row by row, or rows by rows, pixels of a same row of the ineffective pixel region during the one frame time period by the vertical scanning circuit;
selecting at plural times pixels of a same row of the second ineffective pixel region during the one frame time period by the vertical scanning circuit;
averaging signals of pixels in the first and second ineffective pixel regions selected at a first time and correcting signals of the pixels in the effective pixel region by a first correction circuit of the correction circuit; and
averaging signals of pixels in the second ineffective pixel region selected at a second time and following times and correcting the signals of the pixels in the effective pixel region by a second correction circuit of the correction circuit.

* * * * *